(12) United States Patent
Zhang et al.

(10) Patent No.: US 11,947,045 B2
(45) Date of Patent: Apr. 2, 2024

(54) CONTROLLING METHOD FOR ELECTRONIC DEVICE, AND ELECTRONIC DEVICE

(71) Applicant: GUANGDONG OPPO MOBILE TELECOMMUNICATIONS CORP., LTD., Guangdong (CN)

(72) Inventors: Xueyong Zhang, Guangdong (CN); Xiangnan Lyu, Guangdong (CN); Bin Zhao, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 353 days.

(21) Appl. No.: 17/537,393

(22) Filed: Nov. 29, 2021

(65) Prior Publication Data

US 2022/0082661 A1    Mar. 17, 2022

Related U.S. Application Data

(63) Continuation of application No. PCT/CN2020/085819, filed on Apr. 21, 2020.

(30) Foreign Application Priority Data

May 31, 2019  (CN) .......................... 201910472716.4

(51) Int. Cl.
*H04M 1/02*       (2006.01)
*G01S 7/484*      (2006.01)
(Continued)

(52) U.S. Cl.
CPC .............. *G01S 7/484* (2013.01); *G01S 17/89* (2013.01); *G06T 7/521* (2017.01); *G06T 7/55* (2017.01);
(Continued)

(58) Field of Classification Search
CPC ......... G01S 7/484; G01S 17/89; G06T 7/521; G06T 7/55; G06T 2207/10028;
(Continued)

(56) References Cited

U.S. PATENT DOCUMENTS 10,345,959 B2 *   7/2019   Cho ...................... G02B 27/20
10,425,516 B2 *   9/2019   Zenebe ................ G03B 21/145
(Continued)

FOREIGN PATENT DOCUMENTS

CN   204031223 U    12/2014
CN   105763803 A    7/2016
(Continued)

OTHER PUBLICATIONS

Japanese Notice of Reasons for Refusal with English Translation for JP Application 2021571488 dated Nov. 4, 2022. (10 pages).
(Continued)

*Primary Examiner* — Andrew Wendell
(74) *Attorney, Agent, or Firm* — Young Basile Hanlon & MacFarlane, P.C.

(57) ABSTRACT

A controlling method for an electronic device includes: determining an orientation of a laser projector; projecting a laser in a first mode by the laser projector when the laser projector is oriented toward a first side where the display screen is located; and projecting a laser in a second mode by the laser projector when the laser projector is oriented toward a second side opposite to the display screen, and the laser projected in the second mode has a greater energy than that of the laser projected in the first mode.

20 Claims, 16 Drawing Sheets

(51) Int. Cl.
*G01S 17/89* (2020.01)
*G06T 7/521* (2017.01)
*G06T 7/55* (2017.01)
*H04B 1/03* (2006.01)
*H04B 1/08* (2006.01)
*H04N 23/56* (2023.01)

(52) U.S. Cl.
CPC .......... *H04M 1/0272* (2013.01); *H04N 23/56* (2023.01); *G06T 2207/10028* (2013.01)

(58) Field of Classification Search
CPC .... H04N 23/56; G01B 11/2513; G03B 35/08; G03B 15/05; H04M 1/0272; H04M 1/21; H04M 1/026; H04M 2250/20; H04M 1/0264; H04M 2201/34; H04M 2250/12; H04M 1/02; H04B 10/503; H04B 1/03; H04B 1/08
See application file for complete search history.

(56) References Cited

U.S. PATENT DOCUMENTS

| | | | |
|---|---|---|---|
| 2008/0194290 A1 | 8/2008 | Lebert et al. | |
| 2009/0290129 A1* | 11/2009 | Yoshida | H04M 1/0272 455/566 |
| 2009/0322745 A1 | 12/2009 | Zhang et al. | |
| 2011/0117958 A1 | 5/2011 | Kim et al. | |
| 2011/0286170 A1* | 11/2011 | Liu | G06F 1/1686 361/679.4 |
| 2011/0291935 A1* | 12/2011 | Liu | G06F 3/021 348/333.1 |
| 2012/0017147 A1* | 1/2012 | Mark | G06F 3/0346 715/848 |
| 2014/0298271 A1* | 10/2014 | Jakubiak | G06F 3/04812 715/856 |
| 2015/0347833 A1 | 12/2015 | Robinson et al. | |
| 2016/0073073 A1* | 3/2016 | Ha | H04N 9/3173 353/28 |
| 2016/0165023 A1 | 6/2016 | Song | |
| 2017/0075092 A1 | 3/2017 | Kim et al. | |
| 2019/0260863 A1* | 8/2019 | Kinouchi | H04M 1/0272 |
| 2019/0317216 A1* | 10/2019 | Zhang | G03B 17/54 |
| 2020/0213433 A1* | 7/2020 | Griffith | G03H 1/02 |

FOREIGN PATENT DOCUMENTS

| | | |
|---|---|---|
| CN | 106686321 A | 5/2017 |
| CN | 107743156 A | 2/2018 |
| CN | 107862853 A | 3/2018 |
| CN | 107896274 A | 4/2018 |
| CN | 107948363 A | 4/2018 |
| CN | 107968910 A | 4/2018 |
| CN | 207283612 U | 4/2018 |
| CN | 108055370 A | 5/2018 |
| CN | 108594451 A | 9/2018 |
| CN | 108683795 A | 10/2018 |
| CN | 109066288 A | 12/2018 |
| CN | 109167855 A | 1/2019 |
| CN | 109192153 A | 1/2019 |
| CN | 109391713 A | 2/2019 |
| CN | 208522805 U | 2/2019 |
| CN | 109451106 A | 3/2019 |
| CN | 109495617 A | 3/2019 |
| CN | 110213413 A | 9/2019 |
| CN | 209676289 U | 11/2019 |
| EP | 2178276 A2 | 4/2010 |
| EP | 2316213 A1 | 5/2011 |
| JP | 2006245799 A | 9/2006 |
| JP | 2013513179 A | 4/2013 |
| KR | 20080004546 A | 1/2008 |
| WO | 2016157601 A1 | 10/2016 |

OTHER PUBLICATIONS

Japanese Notice of Reasons for Refusal with English Translation for JP Application 2021571488 dated Apr. 4, 2023 (10 pages).
Korean Office Action with English Translation for KR Application 1020217039467 dated Feb. 17, 2023. (16 pages).
Extended European Search Report for EP Application 20813039.3 dated Jun. 1, 2022. (9 pages).
Indian Examination Report for IN Application 202117055809 dated Jun. 16, 2022. (6 pages).
Chinese First Office Action with English Translation for CN Application 201910472716.4 dated Jan. 27, 2021. (16 pages).
International Search Report with English Translation for PCT Application PCT/CN2020/085819 dated Jul. 22, 2020. (17 pages).

* cited by examiner

CONTROLLING METHOD FOR ELECTRONIC DEVICE, AND ELECTRONIC DEVICE

CROSS-REFERENCE TO RELATED APPLICATION(S)

This application is a continuation application of International Application No. PCT/CN2020/085819, filed Apr. 21, 2020, which claims priority to and benefits of Chinese Patent Application No. 201910472716.4, filed on May 31, 2019, the entire contents of both of which are incorporated herein by reference.

TECHNICAL FIELD

The present disclosure relates to the technical field of consumer electronics, and more particularly to a controlling method for an electronic device and an electronic device.

BACKGROUND

In an existing mobile phone with a laser projector, the laser projector is generally disposed in a front housing of the mobile phone, and the laser projector is only used in a front usage state to shoot a closer object in distance. For example, the laser projector is only used in the front usage state to acquire a depth image. Therefore, the laser projector can only be used in fewer scenes.

SUMMARY

Embodiments of the present disclosure provide a controlling method for an electronic device and an electronic device.

Embodiments of the present disclosure provide a controlling method for an electronic device. The electronic device includes a housing, a display screen and a rotatable assembly, the display screen is disposed at a side of the housing, the rotatable assembly includes a substrate and a laser projector disposed in the substrate, the substrate is rotatably installed to the housing such that the laser projector is selectively oriented toward a first side where the display screen is located or toward a second side opposite to the display screen; and the controlling method includes: determining an orientation of the laser projector; projecting a laser in a first mode by the laser projector when the laser projector is oriented toward the first side where the display screen is located; and projecting a laser in a second mode by the laser projector when the laser projector is oriented toward the second side opposite to the display screen, and the laser projected in the second mode has a greater energy than that of the laser projected in the first mode.

Embodiments of the present disclosure provide an electronic device, which includes a housing, a display screen, a rotatable assembly and a processor, the display screen is disposed at a side of the housing, the rotatable assembly includes a substrate and a laser projector disposed in the substrate, the substrate is rotatably installed to the housing such that the laser projector is selectively oriented toward a first side where the display screen is located or toward a second side opposite to the display screen; the processor is configured to determine an orientation of the laser projector; the laser projector is configured to: project a laser in a first mode when the laser projector is oriented toward the first side where the display screen is located, and project a laser in a second mode when the laser projector is oriented toward the second side opposite to the display screen, and the laser projected in the second mode has a greater energy than that of the laser projected in the first mode.

Additional aspects and advantages of embodiments of present disclosure will be given in part in the following descriptions, become apparent in part from the following descriptions, or be learned from the practice of the embodiments of the present disclosure.

BRIEF DESCRIPTION OF DRAWINGS

These and/or other aspects and advantages of embodiments of the present disclosure will become apparent and more readily appreciated from the following descriptions made with reference to the drawings, in which.

DETAILED DESCRIPTION

Figure 1:
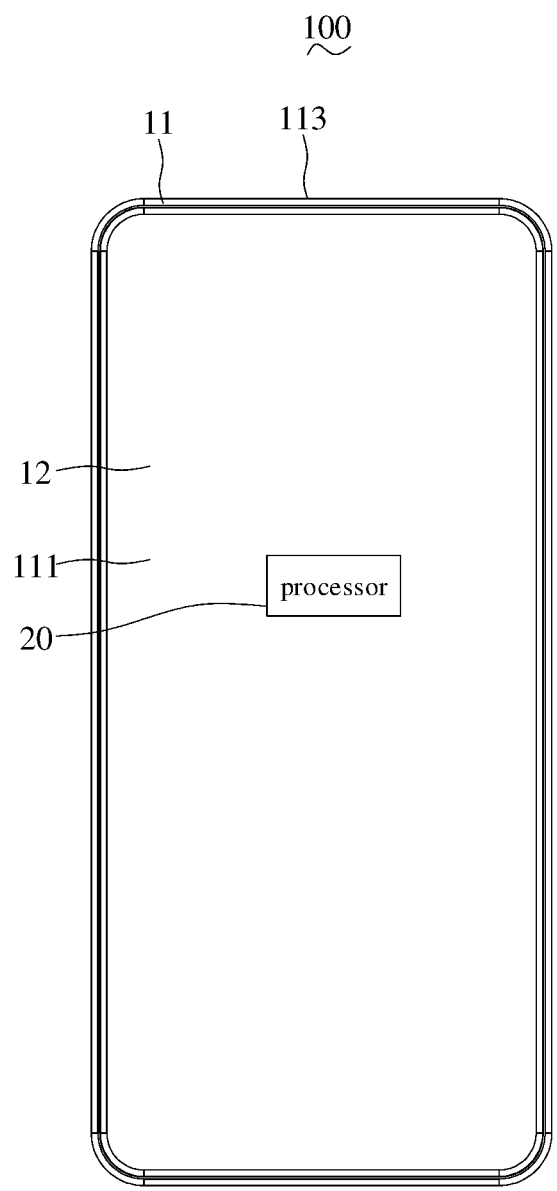
FIG. 1 is a schematic diagram of an electronic device according to some embodiments of the present disclosure.

Embodiments of the present disclosure will be described in detail below, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are only used to generally understand the present disclosure, but shall not be construed to limit the present disclosure.

Figure 2:
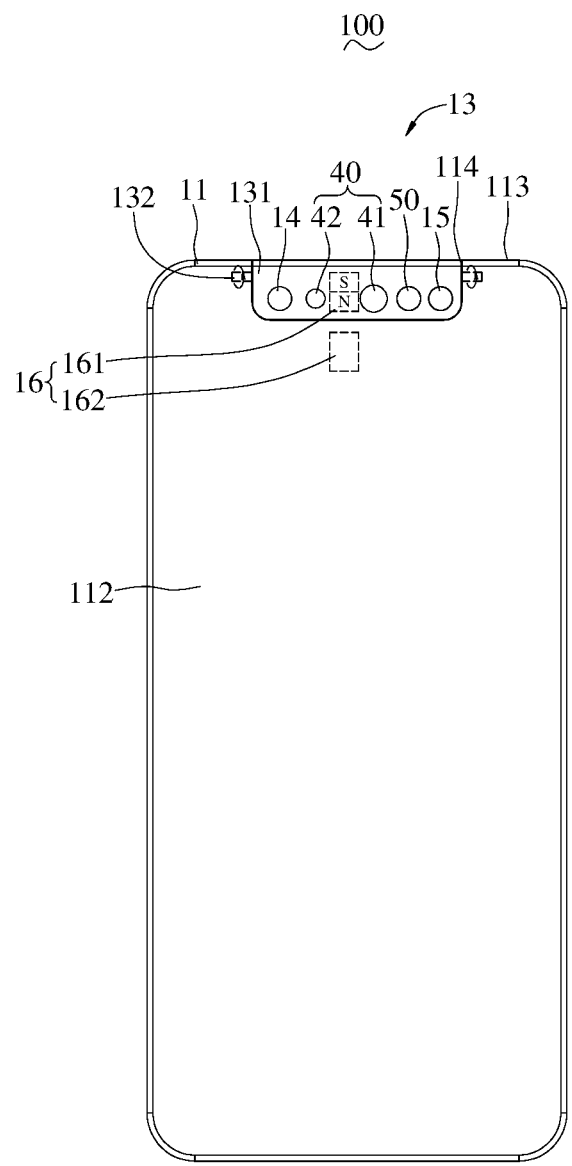
FIG. 2 is a schematic diagram of an electronic device according to some embodiments of the present disclosure.
Figure 3:
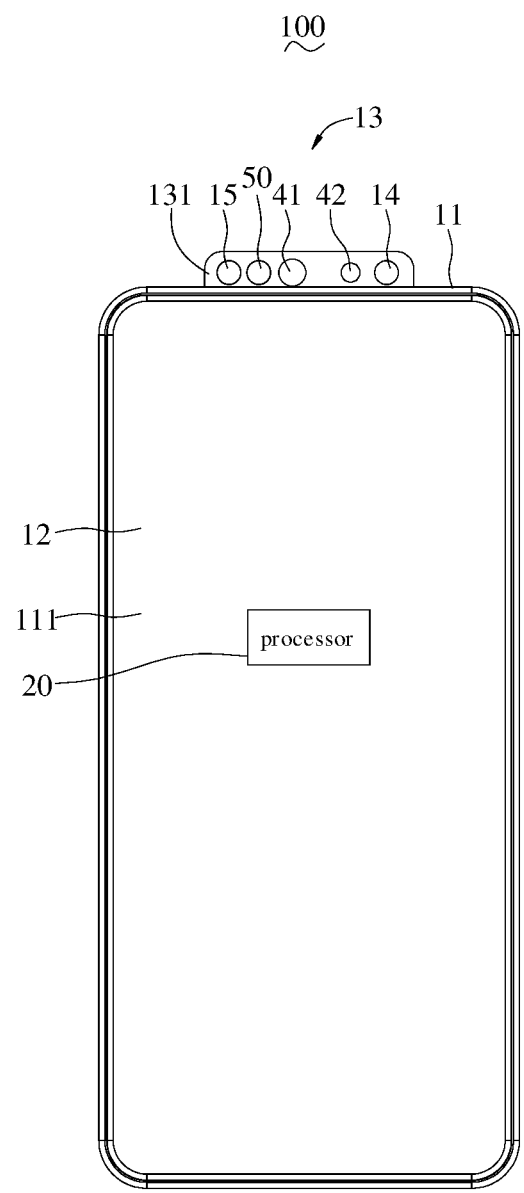
FIG. 3 is a schematic diagram of an electronic device according to some embodiments of the present disclosure.
Figure 4:
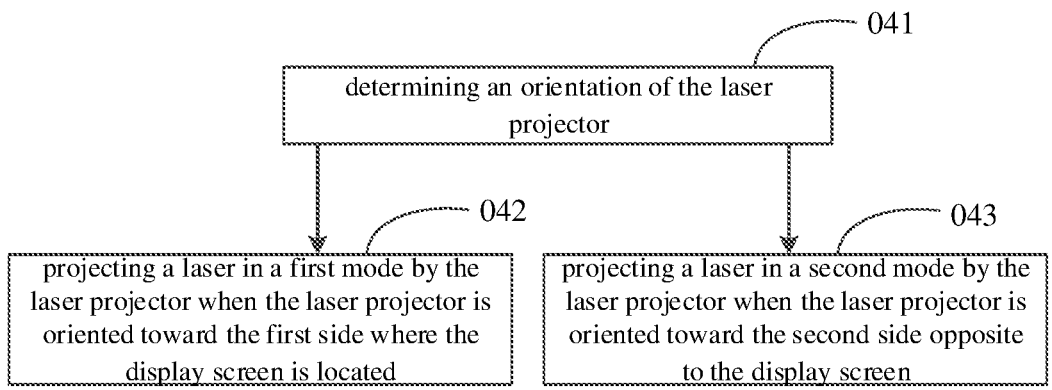
FIG. 4 is a schematic flowchart of a controlling method for an electronic device according to some embodiments of the present disclosure.

As illustrated in FIG. 1 to FIG. 4, a controlling method for an electronic device 100 according to the present disclosure is applicable to the electronic device 100. The electronic device 100 includes a housing 11, a display screen 12 and a rotatable assembly 13, the display screen 12 is disposed at a side of the housing 11, the rotatable assembly 13 includes a substrate 131 and a laser projector 14 disposed in the substrate 131, and the substrate 131 is rotatably installed to the housing 11 such that the laser projector 14 is selectively oriented toward a first side where the display screen 12 is located or toward a second side opposite to the display screen 12. As illustrated in FIG. 4, the controlling method includes:

041, determining an orientation of the laser projector 14;

042, projecting a laser in a first mode by the laser projector 14 when the laser projector 14 is oriented toward the first side where the display screen 12 is located (as illustrated in FIG. 3); and 043, projecting a laser in a second mode by the laser projector 14 when the laser projector 14 is oriented toward the second side opposite to the display screen 12 (as illustrated in FIG. 2).

As illustrated in FIG. 2, in some embodiments, the electronic device 100 further includes a Hall sensor assembly 16, the Hall sensor assembly 16 includes a first sensor 161 and a second sensor 162, the first sensor 161 is disposed in the substrate 131, and the second sensor 162 is disposed in the housing 11 and corresponds to the first sensor 161; and the determining (041) the orientation of the laser projector 14 includes: determining the orientation of the laser projector 14 through the Hall sensor assembly 16.

Figure 7:
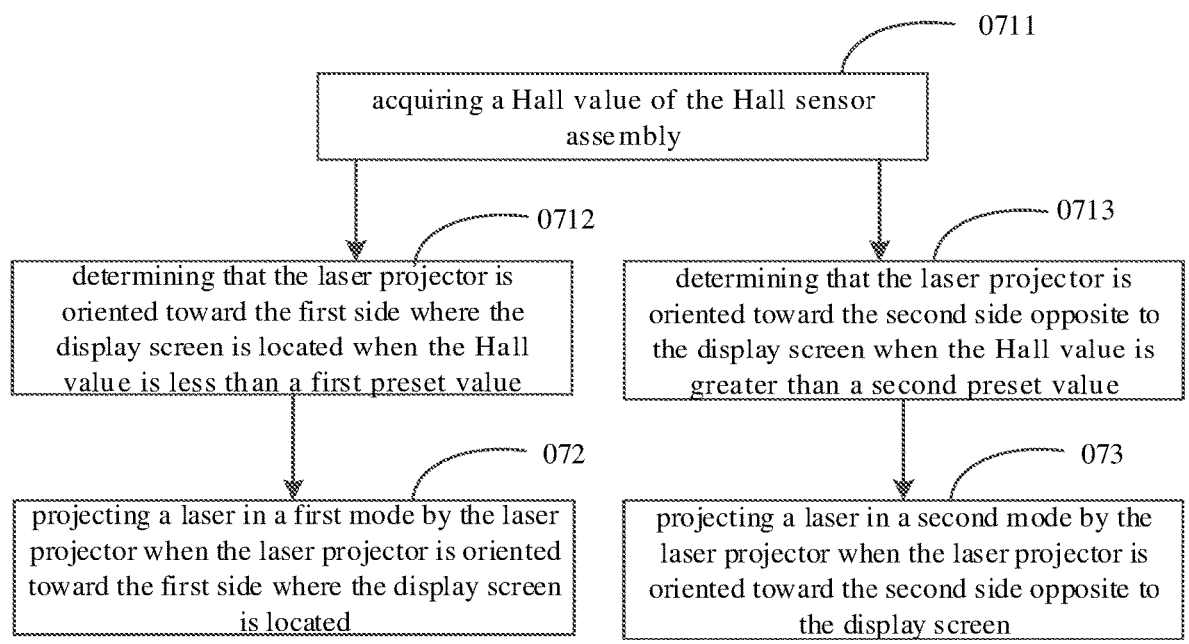
FIG. 7 is a schematic flowchart of a controlling method for an electronic device according to some embodiments of the present disclosure.

As illustrated in FIG. 2 and FIG. 7, in some embodiments, the determining the orientation of the laser projector 14 through the Hall sensor assembly 16 includes:

0711, acquiring a Hall value of the Hall sensor assembly 16;

0712, determining that the laser projector 14 is oriented toward the first side where the display screen 12 is located when the Hall value is less than a first preset value; and 0713, determining that the laser projector 14 is oriented toward the second side opposite to the display screen 12 when the Hall value is greater than a second preset value.

Figure 5:
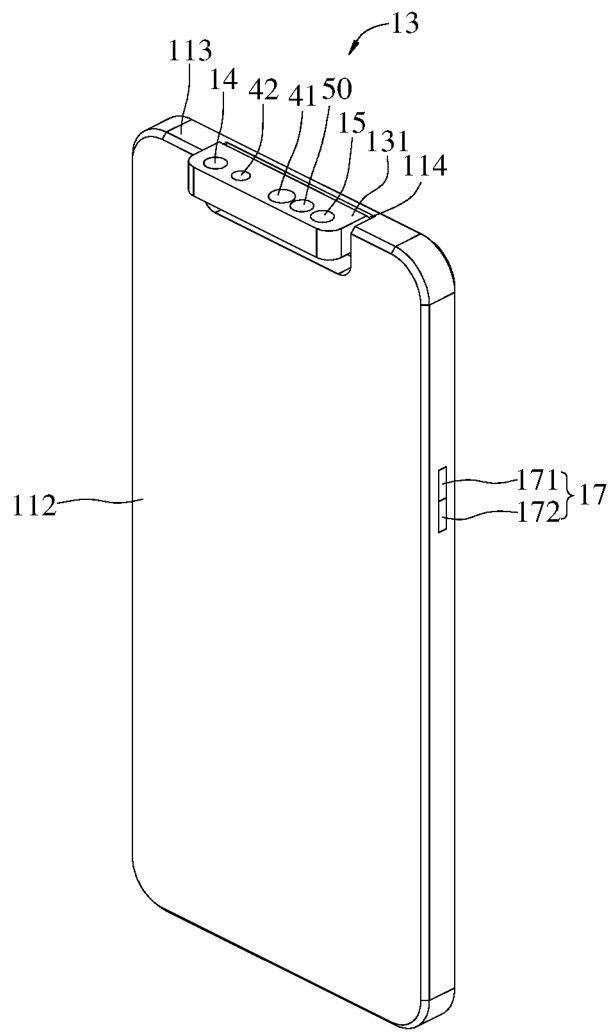
FIG. 5 is a schematic perspective diagram of an electronic device according to some embodiments of the present disclosure.

As illustrated in FIG. 5, in some embodiments, the electronic device 100 further includes a state selection key 17, and the determining (041) the orientation of the laser projector 14 includes: determining the orientation of the laser projector 14 through the state selection key 17.

As illustrated in FIG. 1 to FIG. 3, in some embodiments, a power of the laser projector 14 for projecting the laser in the first mode is smaller than that of the laser projector 14 for projecting the laser in second mode; and/or the laser projector 14 includes a plurality of point light sources 141 each controlled independently, and the number of the point light sources 141 turned on by the laser projector 14 in the first mode is less than that of the point light sources 141 turned on by the laser projector 14 in the second mode.

In some embodiments, the electronic device 100 further includes an image collector 15 disposed at a surface of the substrate 131 where the laser projector 14 is located, when the laser projector 14 projects a laser, the laser projector 14 projects the laser at a first operating frequency to a scene. The controlling method further includes:

0114: acquiring collection images by the image collector 15 at a second operating frequency, the second operating frequency being greater than the first operating frequency;

0115: distinguishing, among the collection images, a first image collected when the laser projector 14 does not project the laser from a second image collected when the laser projector 14 projects the laser; and 0116: calculating a depth image according to the first image, the second image and a reference image.

As illustrated in FIG. 1 to FIG. 4, the electronic device 100 according to embodiments of the present disclosure includes a housing 11, a display screen 12, a rotatable assembly 13 and a processor 20. The display screen 12 is disposed at a side of the housing 11. The rotatable assembly 13 includes a substrate 131 and a laser projector 14 disposed in the substrate 131. The substrate 131 is rotatably installed to the housing 11 such that the laser projector 14 is selectively oriented toward a first side where the display screen 12 is located or toward a second side opposite to the display screen 12. The processor 20 is configured to determine an orientation of the laser projector 14. The laser projector 14 is configured to: project a laser in a first mode when the laser projector 14 is oriented toward the first side where the display screen 12 is located, and project a laser in a second mode when the laser projector 14 is oriented toward the second side opposite to the display screen 12. The laser projected in the second mode has a greater energy than that of the laser projected in the first mode.

As illustrated in FIG. 2, in some embodiments, the electronic device 100 further includes a Hall sensor assembly 16, the Hall sensor assembly 16 includes a first sensor 161 and a second sensor 162, the first sensor 161 is disposed in the substrate 131, and the second sensor 162 is disposed in the housing 11 and corresponds to the first sensor 161; and the processor 20 is further configured to determine the orientation of the laser projector 14 through the Hall sensor assembly 16.

As illustrated in FIG. 2 and FIG. 7, in some embodiments, the processor 20 is further configured to:

0711, acquire a Hall value of the Hall sensor assembly 16;

0712, determine that the laser projector 14 is oriented toward the first side where the display screen 12 is located when the Hall value is less than a first preset value; and 0713, determine that the laser projector 14 is oriented toward the second side opposite to the display screen 12 when the Hall value is greater than a second preset value.

As illustrated in FIG. 5, in some embodiments, the electronic device 100 further includes a state selection key 17, and the processor 20 is further configured to determine the orientation of the laser projector 14 through the state selection key 17.

As illustrated in FIG. 1 to FIG. 3, in some embodiments, power of the laser projector 14 for projecting the laser in the first mode is smaller than that of the laser projector 14 for projecting the laser in second mode; and/or the laser projector 14 includes a plurality of point light sources 141 each controlled independently; and the number of the point light sources 141 turned on by the laser projector 14 in the first mode is less than that of the point light sources 141 turned on by the laser projector 14 in the second mode.

As illustrated in FIG. 3, in some embodiments, the electronic device 100 further includes an image collector 15 disposed at a surface of the substrate 131 where the laser projector 14 is located, when the laser projector 14 projects a laser, the laser projector 14 is configured to project the laser at a first operating frequency to a scene; the image collector 15 is configured to acquire collection images at a second operating frequency, and the second operating frequency is greater than the first operating frequency; and the processor 20 is configured to: distinguish, among the collection images, a first image collected when the laser projector 14 does not project the laser from a second image collected when the laser projector 14 projects the laser; and to calculate a depth image according to the first image, the second image and a reference image.

As illustrated in FIG. 1 to FIG. 3, in some embodiments, the housing 11 has an end surface 113 and a rear surface 112 opposite to the display screen 12, the rear surface 112 is defined with a receiving groove 114 penetrating the end surface 113, and the rotatable assembly 13 is rotatably installed in the receiving groove 114; when the laser projector 14 is oriented toward the first side where the display screen 12 is located, the substrate 131 protrudes from the end surface 113; when the laser projector 14 is oriented toward the second side opposite to the display screen 12, a surface of the substrate 131 is flush with the end surface 113.

As illustrated in FIG. 1 to FIG. 3, in some embodiments, the housing 11 has a front surface 111, a rear surface 112 and an end surface 113, the front surface 111 and the rear surface 112 are located at two opposite sides of the housing 11, respectively, the end surface 113 is connected with the front surface 111 and the rear surface 112, the display screen 12 is disposed on the front surface 111 and defined with a notch 121 at an end thereof close to the end surface 113, the housing 11 is defined with an accommodating groove 115 which penetrates the front surface 111, the rear surface 112 and the end surface 113 and is communicated with the notch 121, and the rotatable assembly 13 is rotatably installed in the accommodating groove 115.

As illustrated in FIG. 1 to FIG. 3, in some embodiments, the housing 11 has a front surface 111, a rear surface 112 and an end surface 113, the display screen 12 is installed on the front surface 111 of the housing 11 and covers 85% or more of an area of the front surface 111.

Figure 6:
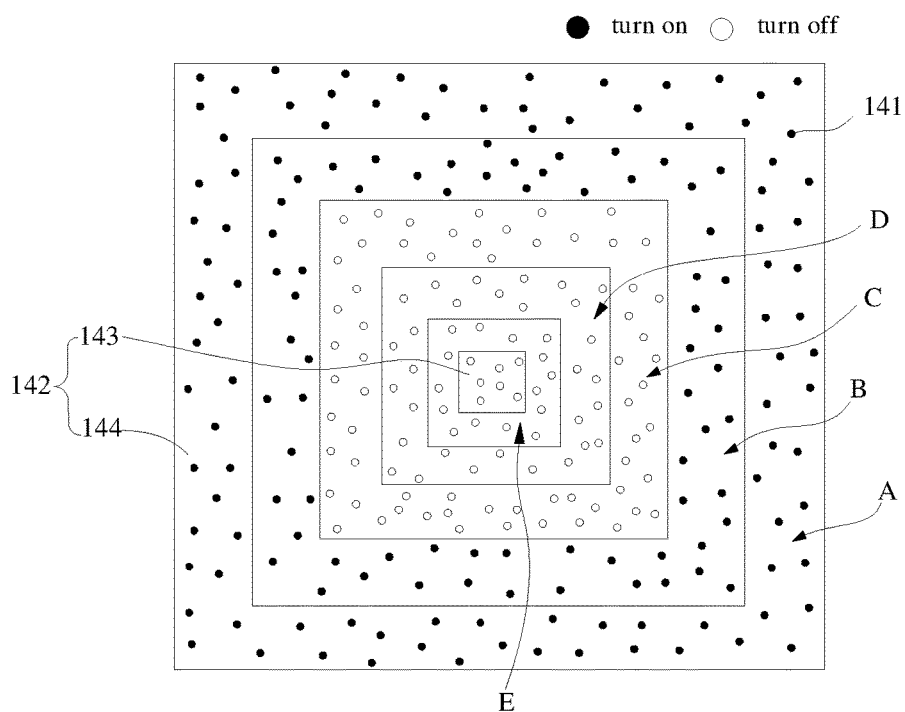
FIG. 6 is a schematic diagram of a laser source of a laser projector in an electronic device according to some embodiments of the present disclosure.
Figure 10:
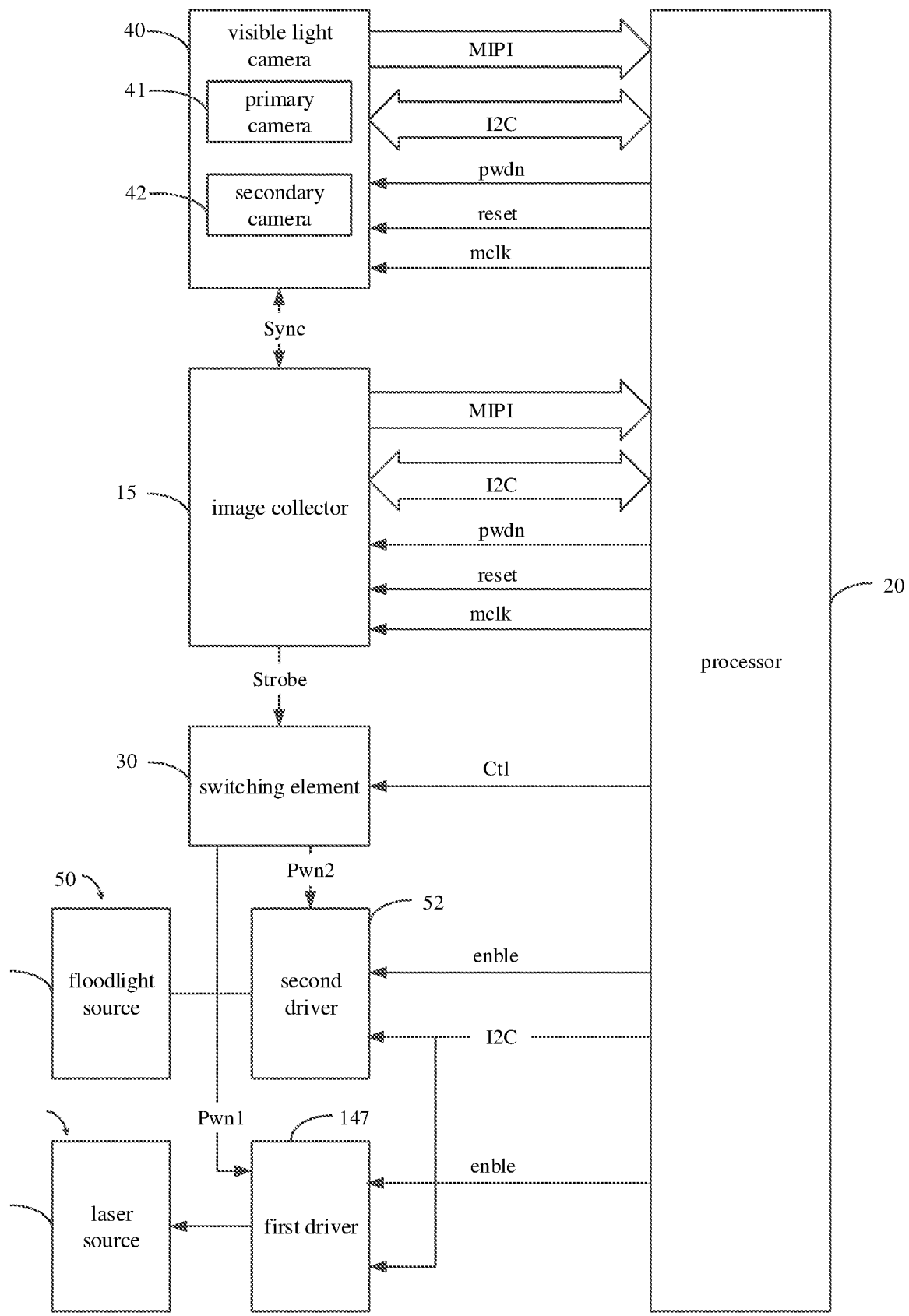
FIG. 10 is a schematic diagram illustrating a system architecture of an electronic device according to some embodiments of the present application.

As illustrated in FIG. 6 and FIG. 10, in some embodiments, the laser projector 14 includes a laser source 140, the laser source 140 includes a plurality of point light sources 141; and the plurality of the point light sources 141 form a plurality of light emitting arrays 142 arranged in an annular shape.

As illustrated in FIG. 6 and FIG. 10, in some embodiments, the light emitting arrays 142 are turned on in such a manner that the farther a light emitting array 142 is away from a center of the laser source 140, the earlier the light emitting array 142 is turned on.

As illustrated in FIG. 6 and FIG. 10, in some embodiments, the laser projector 14 includes a laser source 140 and a first driver 147, and the first driver 147 is configured to drive the laser source 140 to project a laser to an object to be measured.

Figure 8:
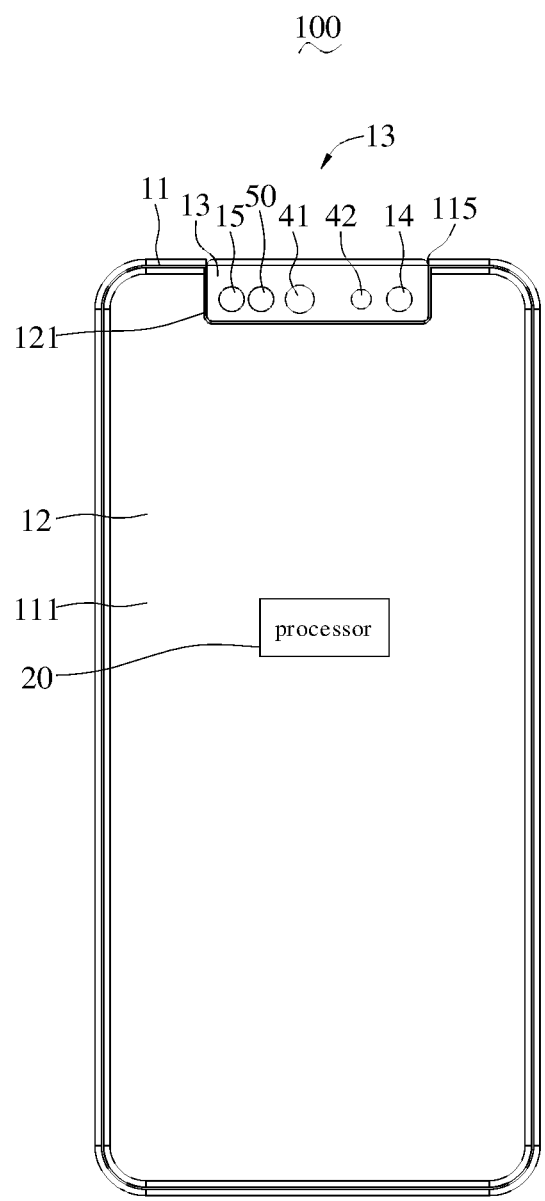
FIG. 8 is a schematic perspective diagram of an electronic device according to some embodiments of the present disclosure.

As illustrated in FIG. 8, in some embodiments, the housing 11 has a front surface 111, a rear surface 112 and an end surface 113, the display screen 12 is disposed on the front surface 111 of the housing 11 and defined with a notch 121 at an end thereof close to the end surface 113.

As illustrated in FIG. 5 and FIG. 8, in some embodiments, the electronic device 100 further includes a floodlight 50 disposed in the substrate 131, and the floodlight 50 and the laser projector 14 are located at the same surface of the substrate 131.

As illustrated in FIG. 1 to FIG. 3, in the controlling method for an electronic device 100 according to the present disclosure, the electronic device 100 includes a housing 11, a display screen 12 and a rotatable assembly 13, the display screen 12 is disposed at a side of the housing 11, the rotatable assembly 13 includes a substrate 131 and a laser projector 14 disposed in the substrate 131, and the substrate 131 is rotatably installed to the housing 11 such that the laser projector 14 is selectively oriented toward a first side where the display screen 12 is located or toward a second side opposite to the display screen 12; as illustrated in FIG. 4, the controlling method includes:

041, determining an orientation of the laser projector 14;

042, projecting a laser in a first mode by the laser projector 14 when the laser projector 14 is oriented toward the first side where the display screen 12 is located (as illustrated in FIG. 3); and 043, projecting a laser in a second mode by the laser projector 14 when the laser projector 14 is oriented toward the second side opposite to the display screen 12 (as illustrated in FIG. 2).

The electronic device 100 according to the present disclosure may be used to implement the aforementioned controlling method. Specifically, the electronic device 100 further includes a processor 20, the step 041 may be implemented by the processor 20, and the steps 042 and 043 may be implemented by the laser projector 14. In other words, the processor 20 may be configured to determine the orientation of the laser projector 14, and the laser projector 14 may be configured to project a laser in a first mode when the laser projector 14 is oriented toward the first side where the display screen 12 is located, and project a laser in a second mode by the laser projector 14 when the laser projector 14 is oriented toward the second side opposite to the display screen 12.

The electronic device 100 may be a mobile phone, a tablet computer, a laptop computer, a smart wearable device (such as a smart watch, a smart bracelet, a smart helmet, smart glasses, etc.), a virtual reality device, and the like. The present disclosure will be illustrated by taking a mobile phone as an example of the electronic device 100, but the form of the electronic device 100 is not limited to a mobile phone.

As illustrated in FIG. 1 and FIG. 5, the housing 11 includes a front surface 111, a rear surface 112 and an end surface 113, the front surface 111 and the rear surface 112 are located at two opposite sides of the housing 11, respectively, and the end surface 113 is connected with the front surface 111 and the rear surface 112. In embodiments of the present disclosure, the rear surface 112 is defined with a receiving groove 114 penetrating the end surface 113.

The display screen 12 is installed on the front surface 111 of the housing 11 and covers 85% or more of an area of the front surface 111, such as 85%, 86%, 87%, 88%, 89%, 90%, 91%, 92%, 93%, 95% or even 100% of the area of the front surface 111. The display screen 12 may be configured to display a screenage, and the screenage may include information like text, images, videos, icons and the like.

The rotatable assembly 13 is rotatably installed in the receiving groove 114. Specifically, the rotatable assembly 13 includes the substrate 131 and the laser projector 14, the substrate 131 includes two rotating shafts 132 (as illustrated in FIG. 2) installed to two opposite sidewalls of the receiving groove 114, respectively, and an axial line passing through the rotating shafts 132 is parallel to each of the front surface 111, the rear surface 112 and the end surface 113. The laser projector 14 is installed in the substrate 131 and exposed from a surface of the substrate 131. The rotation of the substrate 131 drives the laser projector 14 to rotate, so that the laser projector 14 is selectively oriented toward the first side where the display screen 12 is located or toward the second side opposite to the display screen 12, when the laser projector 14 is oriented toward the first side where the display screen 12 is located, the substrate 131 protrudes from the end surface 113; when the laser projector 14 is oriented toward the second side opposite to the display screen 12, a surface of the substrate 131 is flush with the end surface 113, and the substrate 131 does not protrude from the end surface 113.

The electronic device 100 further includes an image collector 15, the image collector 15 is disposed in the substrate 131 and located at a surface of the substrate 131 where the laser projector 14 is located, that is, the laser projector 14 and the image collector 15 are exposed from the same surface of the substrate 131. The laser projector 14 is cooperated with the image collector 15 to acquire depth information of an object to be measured for three-dimensional modeling, three-dimensional image generation, distance measurement and the like. The laser projector 14 and the image collector 15 may be installed on a bracket, and then the bracket, the laser projector 14 and the image collector 15 are installed in the substrate 131 together. Alternatively, the substrate 131 is a bracket, and the laser projector 14 and the image collector 15 are both installed in the substrate 131.

Generally, when the user of the electronic device 100 uses the electronic device 100, the display screen 12 is oriented toward the user. When the laser projector 14 is oriented toward the first side where the display screen 12 is located (as illustrated in FIG. 3), the laser projector 14 is in a front usage state, and both the display screen 12 and the laser projector 14 face the user of the electronic device 100, in this case, the laser projector 14 may be used as a front laser projector, the user is able to view the content displayed on the display screen 12 and use the laser projector 14 to project a laser towards a side where the user is located, such that the user is able to use the laser projector 14 (and the image collector 15) to perform face recognition, iris recognition, and the like. When the laser projector 14 is oriented toward the second side opposite to the display screen 12, the laser projector 14 is in a rear usage state (as illustrated in FIG. 2), the display screen 12 faces the user of the electronic device 100, and the laser projector 14 faces away from the user of the electronic device 100, in this case, the laser projector 14 may be used as a rear laser projector, the user is able to view the content displayed on the display screen 12 and use the laser projector 14 to project a laser towards a side away from the user, for example, the user is able to use the laser projector 14 (and the image collector 15) to acquire a depth image of an object to be measured at a side of the electronic device 100 facing away from the user.

In embodiments of the present disclosure, the laser projector 14 may be used in the first mode or the second mode to project a laser, the first mode corresponds to a case that the laser projector 14 is in the front usage state, the second mode corresponds to a case that the laser projector 14 is in the rear usage state, and the energy of the laser projected in the second mode is greater than that of the laser projected in the first mode. Specifically, a power of the laser projector 14 for projecting the laser in the first mode may be less than that of the laser projector 14 for projecting the laser in the second mode, so that the energy of the laser projected in the second mode is greater than that of the laser projected in the first mode, and in this case, a maximum distance (i.e., a projection distance) reachable by the laser projected by the laser projector 14 in the second mode is greater than a maximum distance (i.e., a projection distance) reachable by the laser projected by the laser projector 14 in the first mode. At the same time, a rear distance range detectable by the image collector 15 in cooperation with the laser projector 14 in the rear usage state is greater than a front distance range detectable by the image collector 15 in cooperation with the laser projector 14 in the front usage state. For example, the front distance range detectable by the image collector 15 in cooperation with the laser projector 14 is within 25 cm, while the rear distance range detectable by the image collector 15 in cooperation with the laser projector 14 is greater than 25 cm (an accuracy within the distance range of 25 cm is very poor). Alternatively, the front distance range slightly overlaps the rear distance range, for example, the front distance range detectable by the image collector 15 in cooperation with the laser projector 14 is within 25 cm, while the rear distance range detectable by the image collector 15 in cooperation with the laser projector 14 is greater than 20 cm.

In the electronic device 100 and the controlling method for the electronic device 100 according to the present disclosure, the rotatable assembly 13 is rotatably installed to the housing 11, such that the laser projector 14 is selectively oriented toward the first side where the display screen 12 is located or toward the second side opposite to the display screen 12, and the maximum distance reachable by the laser projected by the laser projector 14 when the laser projector 14 is oriented toward the second side opposite to the display screen 12 is greater than that reachable by the laser projected by the laser projector 14 when the laser projector 14 is oriented toward the first side where the display screen 12 is located. In this way, the laser projector 14 can be used as both the front laser projector and the rear laser projector, which increases the usage scenes of the electronic device 100; at the same time, there is no need to provide two laser projectors 14 to be used as the front laser projector and the rear laser projector, respectively, thereby saving the cost of the electronic device 100.

As illustrated in FIG. 6, in some embodiments, the laser projector 14 includes a laser source 140, the laser source 140 includes a plurality of point light sources 141 each controlled independently. Specifically, each point light source 141 can be turned on and off independently. The number of the point light sources 141 turned on by the laser projector 14 in the first mode is less than that of the point light sources 141 turned on by the laser projector 14 in the second mode, in this case, the power of each point light source 141 for projecting the laser may be the same, so that the energy of the laser projected in the second mode is greater than that of the laser projected in the first mode, and the maximum distance reachable by the laser projected by the laser projector 14 in the second mode is greater than that reachable by the laser projected by the laser projector 14 in the first mode.

As illustrated in FIG. 6, in some embodiments, the plurality of the point light sources 141 form a plurality of light emitting arrays 142, and the plurality of the light emitting arrays 142 are each controlled independently. Specifically, multiple point light sources 141 in each light emitting array 142 can be turned on or off at the same time, and the power of the multiple point light sources 141 in each light emitting array 142 may be the same. In other embodiments, the multiple point light sources 141 in each light emitting array 142 may also be controlled independently.

In some embodiments, the plurality of the light emitting arrays 142 are arranged in an annular shape. Lasers emitted by the point light sources 141 in the light emitting array 142 arranged in the annular shape can cover a wider field of view, so that more depth information of the object to be measured can be obtained. Among others, the annular shape may be a square annular shape or a circular annular shape.

As illustrated in FIG. 6, in some embodiments, as the projection distance increases, the light emitting arrays 142 are turned on in such a manner that the farther a light emitting array 142 is away from a center of the laser source 140, the earlier the light emitting array 142 is turned on. For example, as illustrated in FIG. 6, there are six light emitting arrays 142 in total, including five annular sub-arrays 144 and one square sub-array 143. In a direction from a periphery of the laser source 140 to the center of the laser source 140, the five annular sub-arrays 144 are arranged in sequence, which are marked as A, B, C, D, and E. In some embodiments, when the laser projector 14 is oriented toward the first side where the display screen 12 is located, the point light sources 141 in the annular sub-arrays 144 marked as A and B are turned on; when the laser projector 14 is oriented toward the second side opposite to the display screen 12, the point light sources 141 in the annular sub-arrays 144 marked as A, B and C may be turned on, or the point light sources 141 in the annular sub-arrays 144 marked as A, B, C and D may be turned on, or the point light sources 141 in the annular sub-arrays 144 marked as A, B, C, D and E may be turned on, or the point light sources 141 in the annular sub-arrays 144 marked as A, B, C, D and E and the point light sources 141 in the square sub-array 143 may be turned on.

In some embodiments, the number of the point light sources 141 turned on when the laser projector 14 is in the first mode is less than that of the point light sources 141 turned on when the laser projector 14 is in the second mode, so that the energy of the laser projected by the laser projector 14 when the laser projector 14 is oriented toward the first side where the display screen 12 is located is less than that of the laser projected by the laser projector 14 when the laser projector 14 is oriented toward the second side opposite to the display screen 12.

It can be understood that a diffractive optical element (not shown in figures) of the laser projector 14 has a limited diffraction ability, that is, a part of the lasers emitted by the laser source 140 is not diffracted by the diffractive optical element but is directly emitted. The laser emitted directly has a larger energy, which is very likely to harm the user's eyes. Therefore, when the laser projector 14 is oriented toward the first side where the display screen 12 is located, the laser projector 14 projects the laser in the first mode, that is, when the projection distance is shorter, the laser projector 14 first turns on the annular sub-array 144 away from the center of the laser source 140, which avoids the laser projected by the laser source 140 to enter the user's eyes directly without undergoing the diffraction attenuation effect of the diffractive optical element, thereby improving the security of the laser projector 14; and when the laser projector 14 is oriented toward the second side opposite to the display screen 12, the laser projector 14 projects the laser in the second mode, that is, when the projection distance is longer, the laser projector 14 simultaneously turns on the annular sub-array 144 away from the center of the laser source 140 and the annular sub-array 144 near the center of the laser source 140, so as to increase the maximum distance reachable by the lasers projected by the laser projector 14.

As illustrated in FIG. 2 and FIG. 7, in some embodiments, the electronic device 100 further includes a Hall sensor assembly 16, the Hall sensor assembly 16 includes a first sensor 161 and a second sensor 162, the first sensor 161 is disposed in the substrate 131, and the second sensor 162 is disposed in the housing 11 and corresponds to the first sensor 161; and the determining the orientation of the laser projector 14 may be achieved through the Hall sensor assembly 16. Specifically, the controlling method includes:

0711, acquiring a Hall value of the Hall sensor assembly 16;

0712, determining that the laser projector 14 is oriented toward the first side where the display screen 12 is located when the Hall value is less than a first preset value;

0713, determining that the laser projector 14 is oriented toward the second side opposite to the display screen 12 when the Hall value is greater than a second preset value;

072, projecting a laser in a first mode by the laser projector 14 when the laser projector 14 is oriented toward the first side where the display screen 12 is located; and 073, projecting a laser in a second mode by the laser projector 14 when the laser projector 14 is oriented toward the second side opposite to the display screen 12.

The above controlling method may also be implemented by the electronic device 100, in which the steps 0711, 0712 and 0713 may be sub-steps of the step 041 described hereinbefore, the step 072 is basically the same as the step 042 described hereinbefore, and the step 073 is basically the same as the step 043 described hereinbefore. Specifically, the processor 20 is electrically connected to the Hall sensor assembly 16, the processor 20 may be further configured to determine the orientation of the laser projector 14 through the Hall sensor assembly 16, and the processor 20 may be further configured to implement the steps 0711, 0712 and 0713. That is, the processor 20 may be further configured to acquire the Hall value of the Hall sensor assembly 16, determine that the laser projector 14 is oriented toward the first side where the display screen 12 is located when the Hall value is less than the first preset value, and determine that the laser projector 14 is oriented toward the second side opposite to the display screen 12 when the Hall value is greater than the second preset value.

In some embodiments of the present disclosure, the first sensor 161 may be a magnet 161, and the second sensor 162 may be a Hall sensor 162. The Hall sensor 162 may be a gauss meter or a digital Hall sensor, and the Hall value is a gauss value. When the laser projector 14 is oriented toward the second side opposite to the display screen 12 (i.e., the rotatable assembly 13 is in an initial state), an S pole of the magnet 161 is located at an end of the magnet 161 close to the Hall sensor 162, and an N pole of the magnet 161 is located at an end of the magnet 161 away from the Hall sensor 162. When the laser projector 14 is oriented toward the first side where the display screen 12 is located, the N pole of the magnet 161 is located at the end of the magnet 161 close to the Hall sensor 162, and the S pole of the magnet 161 is located at the end of the magnet 161 away from the Hall sensor 162. When the S pole of the magnet 161 is closer to the Hall sensor 162, the magnetic field where the Hall sensor 162 is located is stronger, and the Hall value collected by the Hall sensor 162 is larger and is positive; when the N pole of the magnet 161 is closer to the Hall sensor 162, the Hall value collected by the Hall sensor 162 is smaller and is negative.

When the Hall value collected by the Hall sensor 162 is less than the first preset value, for example, when the Hall value of the Hall sensor 162 acquired by the processor 20 is −90, which is less than the first preset value of −85, it is determined that the laser projector 14 is oriented toward the first side where the display screen 12 is located; when the Hall value collected by the Hall sensor 162 is greater than the second preset value, for example, when the Hall value of the Hall sensor 162 acquired by the processor 20 is 40, which is greater than the second preset value of 35, it is determined that the laser projector 14 is oriented toward the second side opposite to the display screen 12. It will be appreciated that, the first preset value and the second preset value are related to factors like characteristics of the magnet 161 and a distance between the magnet 161 and the Hall sensor 162; the characteristics of the magnet 161 include the material, shape and size of the magnet 161; and the shorter the distance between the magnet 161 and the Hall sensor 162, the greater the Hall value collected by the Hall sensor 162.

The electronic device 100 and the controlling method according to embodiments of the present disclosure determine the orientation of the laser projector 14 through the Hall sensor assembly 16, so that the laser projector 14 may be used to project a laser in a corresponding mode without the user manually selecting the orientation of the laser projector 14, which improves the usage experience of the electronic device 100.

As illustrated in FIG. 5, in some embodiments, the electronic device 100 further includes a state selection key 17 electrically connected to the processor 20, and the determination of the orientation of the laser projector 14 may be achieved through the state selection key 17. Specifically, the processor 20 may be further configured to determine the orientation of the laser projector 14 through the state selection key 17. The state selection key 17 may be a physical key and includes a first state key 171 and a second state key 172. When the processor 20 detects that the first state key 171 is triggered, the processor 20 determines that the laser projector 14 is oriented toward the first side where the display screen 12 is located; when the processor 20 detects that the second state key 172 is triggered, the processor 20 determines that the laser projector 14 is oriented toward the second side opposite to the display screen 12. In other embodiments, the state selection key 17 may be a virtual key and may be displayed by the display screen 12. For example, the state selection key 17 may be an orientation switching key displayed by the display screen 12.

The electronic device 100 and the controlling method according to embodiments of the present disclosure determine the orientation of the laser projector 14 through the state selection key 17, so that the user can accurately select the orientation of the laser projector 14 as required.

As illustrated in FIG. 2, in some embodiments, the electronic device 100 further includes a visible light camera 40, the visible light camera 40 includes a primary camera 41 and a secondary camera 42, both the primary camera 41 and the secondary camera 42 are installed in the substrate 131, and the primary camera 41 and the secondary camera 42 are located at a surface of the substrate 131 where the laser projector 14 is located. The primary camera 41 may be a wide-angle camera with low sensitivity to motion, a relatively slow shutter speed can also ensure the sharpness of image shooting, and the wide-angle camera has a large field of view, covers a wide range of scenes, emphasizes the foreground and highlights near and far comparison. The secondary camera 42 may be a telephoto camera, and a telephoto lens of the telephoto camera is able to identify objects at a further distance. Alternatively, the primary camera 41 is a color camera, and the secondary camera 42 is a black and white camera. The electronic device 100 described herein may include a plurality of the cameras, such as two, three, four or more cameras. In some embodiments, the laser projector 14, the secondary camera 42, the primary camera 41 and the image collector 15 are sequentially arranged at intervals along a same straight line.

Figure 9:
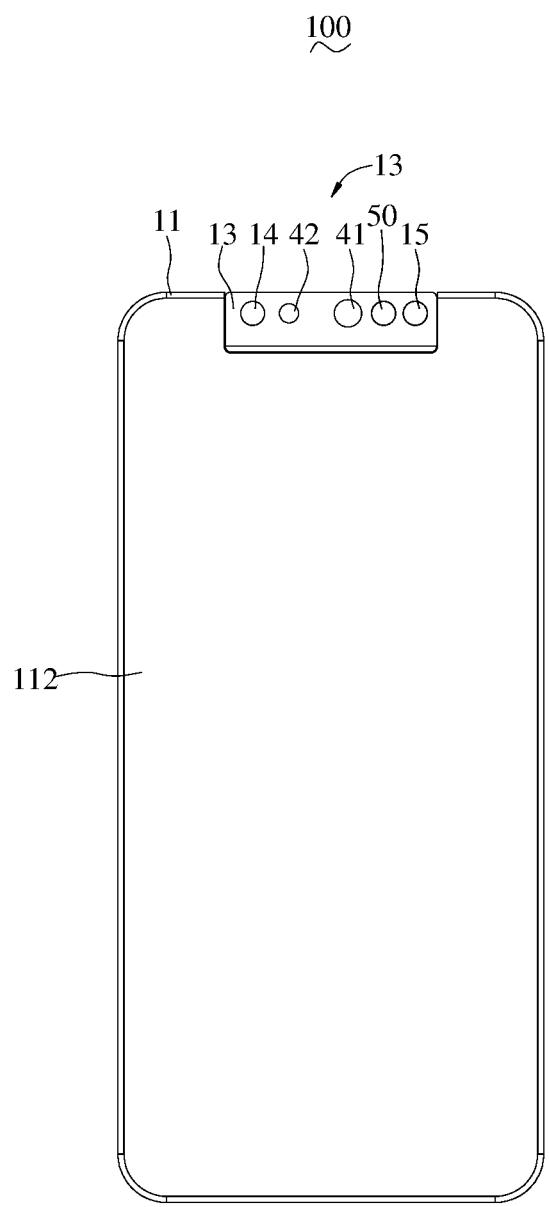
FIG. 9 is a schematic perspective diagram of an electronic device according to some embodiments of the present disclosure.

As illustrated in FIG. 8 and FIG. 9, in some embodiments, the display screen 12 is disposed on the front surface 111 and defined with a notch 121 at an end thereof close to the end surface 113, the housing 11 is defined with an accommodating groove 115 which penetrates the front surface 111, the rear surface 112 and the end surface 113, the accommodating groove 115 corresponds to the notch 121 and is communicated with the notch 121, and the rotatable assembly 13 is rotatably installed in the accommodating groove 115.

In embodiments of the present disclosure, the size of the substrate 131 is slightly smaller than that of the accommodating groove 115 to enable the substrate 131 to rotate in the accommodating groove 115. When the laser projector 14 is oriented toward the second side opposite to the display screen 12, two opposite surfaces (i.e., a front surface and a rear surface) of the substrate 131 are flush with the rear surface 112 and an outermost light-exiting surface of the display screen 12, respectively; when the laser projector 14 is oriented toward the first side where the display screen 12 is located, the two opposite surfaces (i.e., the front surface and the rear surface) of the substrate 131 are flush with the rear surface 112 and the outermost light-exiting surface of the display screen 12, respectively.

As illustrated in FIG. 10, in some embodiments, the laser projector 14 includes a laser source 140 and a first driver 147, and the first driver 147 may be configured to drive the laser source 140 to project a laser to an object to be measured. Both the laser projector 14 and the image collector 15 are connected to the processor 20. The processor 20 may provide an enable signal for the laser projector 14, specifically, the processor 20 may provide an enable signal for the first driver 147. The image collector 15 is connected to the processor 20 via an I2C bus. The laser projector 14 is able to emit a laser, such as an infrared laser, which is reflected by an object in a scene after reaching the object, the reflected laser may be received by the image collector 15, and the processor 20 may calculate depth information of the object according to the laser emitted by the laser projector 14 and laser received by the image collector 15. In an example, the depth information may be obtained by the laser projector 14 and the image collector 15 via time of flight (TOF). In another example, the depth information may be obtained by the laser projector 14 and the image collector 15 based on a structured light ranging principle. The specification of the present disclosure is illustrated by taking the case where the depth information is obtained by the laser projector 14 and the image collector 15 based on the structured light ranging principle as an example. In this case, the laser projector 14 is an infrared laser transmitter, and the image collector 15 is an infrared camera.

When the image collector 15 and the laser projector 14 are cooperated to use, in an example, the image collector 15 may control projection timing of the laser projector 14 through a first strobe signal, which is generated according to timing of the image collector 15 for acquiring collection images and may be regarded as electrical signals with alternate high and low levels, and the laser projector 14 projects the laser according to the laser projection timing instructed by the first strobe signal. Specifically, the processor 20 may send an image collection instruction through an I2C bus to activate the laser projector 14 and the image collector 15 and make the laser projector 14 and the image collector 15 work. After receiving the image collection instruction, the image collector 15 controls a switching element 30 through the first strobe signal, if the first strobe signal is at the high level, the switching element 30 sends a first pulse signal (pwn1) to the first driver 147, and the first driver 147 drives the laser source 140 to project a laser into a scene according to the first pulse signal; if the first strobe signal is at the low level, the switching element 30 stops sending the first pulse signal to the first driver 147, and the laser source 140 does not project the laser. Alternatively, it is also possible that when the first strobe signal is at the low level, the switching element 30 sends the first pulse signal to the first driver 147, and the first driver 147 drives the laser source 140 to project a laser into a scene according to the first pulse signal; when the first strobe signal is at the high level, the switching element 30 stops sending the first pulse signal to the first driver 147, and the laser source 140 does not project the laser. In another example, it is also possible that the first strobe signal is not needed when the image collector 15 and the laser projector 14 are cooperated to use. In this case, the processor 20 sends the image collection instruction to the image collector 15 and sends a laser projection instruction to the first driver 147 at the same time, the image collector 15 starts to acquire the collection image after receiving the image collection instruction, and the first driver 147 drives the laser source 140 to project a laser after receiving the laser projection instruction. When the laser projector 14 projects a laser, the laser forms a laser pattern with speckles, which is projected onto an object to be measured in a scene. The image collector 15 collects the laser pattern reflected by the object to be measured to obtain a speckle image, and sends the speckle image to the processor 20 through a mobile industry processor interface (MIPI). Each time the image collector 15 sends a frame of speckle image to the processor 20, the processor 20 receives a data stream. The processor 20 may calculate a depth image according to the speckle image and a reference image pre-stored in the processor 20.

In some embodiments, the visible light camera 40 may also be connected to the processor 20 via an I2C bus, that is, both the primary camera 41 and the secondary camera 42 are connected to the processor 20 via the I2C bus. The visible light camera 40 may be configured to collect a visible light image; that is to say, the primary camera 41 and the secondary camera 42 are each configured to collect the visible light image, or the primary camera 41 and the secondary camera 42 are cooperated and used together to collect the visible light image; in other words, any one or both of the primary camera 41 and the secondary camera 42 may be used to collect the visible light image. Each time the visible light camera 40 (the primary camera 41 and/or the secondary camera 42) sends a frame of visible light image to the processor 20, the processor 20 receives a data stream. The visible light camera 40 may be used alone, that is, when the user just wants to obtain the visible light image, the processor 20 sends an image collection instruction to the visible light camera 40 (any one or both of the primary camera 41 and the secondary camera 42) via the I2C bus to activate the visible light camera 40 and make the visible light camera 40 work. The visible light camera 40 collects a visible light image of a scene after receiving the image collection instruction, and sends the visible light image to the processor 20 through a mobile industry processor interface. The visible light camera 40 (any one of the primary camera 41 and the secondary camera 42, or the primary camera 41 and the secondary camera 42 together) may also be cooperated with the laser projector 14 and the image collector 15, for example when the user wants to acquire a three-dimensional image based on a visible light image and a depth image, if the image collector 15 has a same operating frequency as that of the visible light camera 40, hardware synchronization between the image collector 15 and the visible light camera 40 may be realized through a sync signal. Specifically, the processor 20 sends the image collection instruction to the image collector 15 via the I2C bus. After receiving the image collection instruction, the image collector 15 may control the switching element 30 to send the first pulse signal (pwn1) to the first driver 147 through the first strobe signal, so that the first driver 147 drives the laser source 140 to emit a laser according to the first pulse signal; at the same time, the image collector 15 is synchronized with the visible light camera 40 through the sync signal, which controls the visible light camera 40 to collect the visible light image.

As illustrated in FIG. 2 and FIG. 10, the electronic device 100 may further include a floodlight 50 disposed in the substrate 131, and the floodlight 50 and the laser projector 14 are located at the same surface of the substrate 131. The floodlight 50 may be configured to emit uniform area light to a scene, the floodlight 50 includes a floodlight source 51 and a second driver 52, and the second driver 52 may be configured to drive the floodlight source 51 to emit the uniform area light. The light emitted by the floodlight 50 may be infrared light or other invisible light, such as ultraviolet light. As an example, the present disclosure will be illustrated with reference to the case where the light emitted by the floodlight 50 is the infrared light, but the form of the light emitted by the floodlight 50 is not limited thereto. The floodlight 50 is connected to the processor 20, and the processor 20 may provide an enable signal to drive the floodlight 50. Specifically, the processor 20 may provide the enable signal for the second driver 52. The floodlight 50 may be cooperated with the image collector 15 to collect an infrared image. When the image collector 15 is cooperated with the floodlight 50 to use, in an example, the image collector 15 may control emission timing of the floodlight 50 for emitting the infrared light through a second strobe signal (independent from the first strobe signal through which the image collector 15 controls the laser projector 14), the second strobe signal is generated according to timing of the image collector 15 for acquiring the collection image and may be regarded as electrical signals with alternate high and low levels, and the floodlight 50 emits the infrared light according to the infrared emission timing instructed by the second strobe signal. Specifically, the processor 20 may send an image collection instruction to the image collector 15 via the I2C bus, and the image collector 15 controls the switching element 30 through the second strobe signal after receiving the image collection instruction, if the second strobe signal is at the high level, the switching element 30 sends a second pulse signal (pwn2) to the second driver 52, and the second driver 52 controls the floodlight source 51 to emit the infrared light according to the second pulse signal; if the second strobe signal is at the low level, the switching element 30 stops sending the second pulse signal to the second driver 52, and the floodlight source 51 does not emit the infrared light. Alternatively, it is also possible that when the second strobe signal is at the low level, the switching element 30 sends the second pulse signal to the second driver 52, and the second driver 52 controls the floodlight source 51 to emit the infrared light according to the second pulse signal; when the second strobe signal is at the high level, the switching element 30 stops sending the second pulse signal to the second driver 52, and the floodlight source 51 does not emit the infrared light. When the floodlight 50 emits the infrared light, the image collector 15 receives infrared light reflected by an object in a scene to form an infrared image, and sends the infrared image to the processor 20 through the mobile industry processor interface. Each time the image collector 15 sends a frame of infrared image to the processor 20, the processor 20 receives a data stream. This infrared image is usually used for iris recognition, face recognition, etc.

Figure 11:
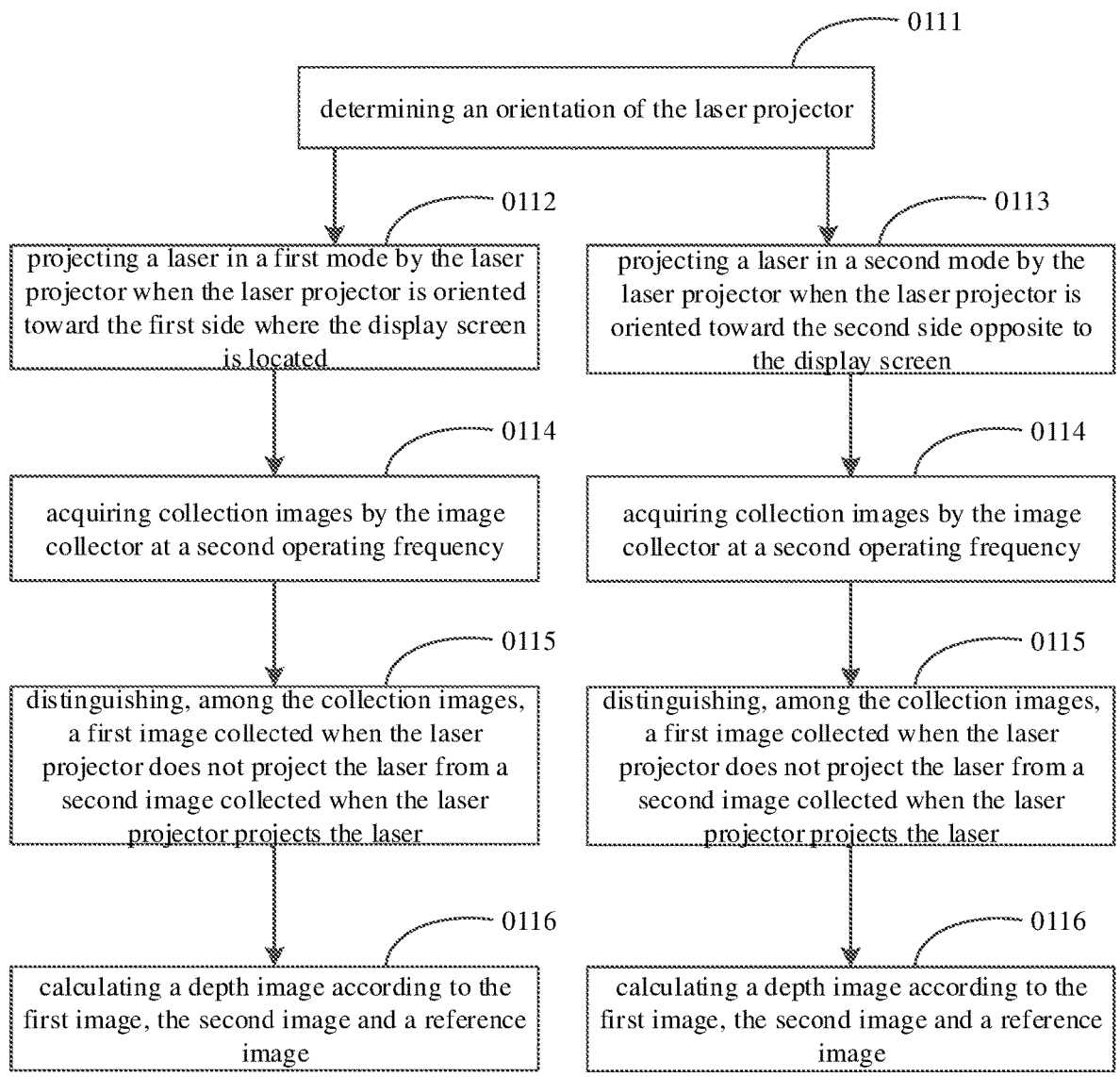
FIG. 11 is a schematic flowchart of a controlling method for an electronic device according to some embodiments of the present disclosure.

As illustrated in FIG. 1, FIG. 2 and FIG. 11, in some embodiments, the electronic device 100 further includes an image collector 15, and the image collector 15 and the laser projector 14 are installed on the same surface of the substrate 131, when the laser projector 14 projects a laser (when the laser projector 14 projects a laser in the first mode, or when the laser projector 14 projects a laser in the second mode), the laser projector 14 projects the laser to a scene at a first operating frequency, and the controlling method further includes:

0114, acquiring collection images by the image collector 15 at a second operating frequency, the second operating frequency being greater than the first operating frequency;

0115, distinguishing, among the collection images, a first image collected when the laser projector 14 does not project the laser from a second image collected when the laser projector 14 projects the laser; and

0116, calculating a depth image according to the first image, the second image and a reference image.

In other words, the controlling methods include:

0111, determining an orientation of the laser projector 14;

0112, projecting a laser in a first mode by the laser projector 14 when the laser projector 14 is oriented toward the first side where the display screen 12 is located;

0113, projecting a laser in a second mode by the laser projector 14 when the laser projector 14 is oriented toward the second side opposite to the display screen 12, the energy of the laser projected in the second mode is greater than that of the laser projected in the first mode;

0114, acquiring collection images by the image collector 15 at a second operating frequency when the laser projector 14 projects a laser to a scene at a first operating frequency, the second operating frequency being greater than the first operating frequency;

0115, distinguishing, among the collection images, a first image collected when the laser projector 14 does not project the laser from a second image collected when the laser projector 14 projects the laser; and

0116, calculating a depth image according to the first image, the second image and a reference image.

The above controlling method may also be implemented by the electronic device 100, in which the step 0111 is basically the same as the step 041 described hereinbefore, the step 0112 is basically the same as the step 042 described hereinbefore, and the step 0113 is basically the same as the step 043 described hereinbefore. The image collector 15 may be configured to implement the step 0114, and the processor 20 may be further configured to implement the steps 0115 and 0116. In other words, the image collector 15 is configured to acquire the collection images at the second operating frequency, and the processor 20 is further configured to distinguish, among the collection images, the first image collected when the laser projector 14 does not project the laser from the second image collected when the laser projector 14 projects the laser, and to calculate the depth image according to the first image, the second image and the reference image.

Figure 12:
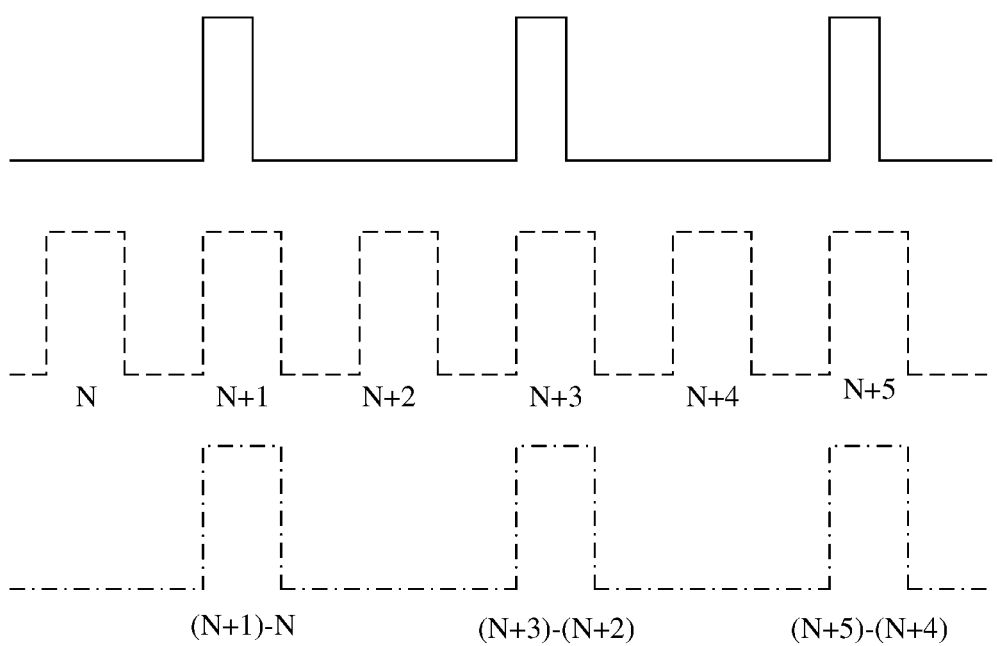
FIG. 12 is a schematic diagram illustrating a principle of a controlling method for an electronic device according to some embodiments of the present disclosure.

Specifically, when the operating frequency of the image collector 15 is different from that of the laser projector 14 (that is, the second operating frequency is greater than the first operating frequency), the depth image needs to be acquired in usage scenes such as unlocking, payment, decryption, and 3D modeling. In an example, the processor 20 simultaneously sends an image collection instruction for acquiring a depth image to the image collector 15 and the first driver 147 via the I2C bus. The first driver 147 drives the laser source 140 to emit the infrared laser to a scene at the first operating frequency after receiving the image collection instruction; and the image collector 15 collects infrared laser reflected back by an object in the scene at the second operating frequency to acquire the collection image after receiving the image collection instruction. For example, as illustrated in FIG. 12, a solid line represents laser emission timing of the laser projector 14, a dashed line represents timing of the image collector 15 for acquiring the collection images and the number of frames of the collection images, and a dot dash line represents the number of frames of the third images obtained according to the first image and the second image, and the three kinds of lines, i.e., the solid line, the dashed line and the dot dash line are shown in this order from top to bottom in FIG. 12, and the second operating frequency is twice the first operating frequency. Referring to the solid line and the dashed line as illustrated in FIG. 12, the image collector 15 first receives infrared light in the environment (hereinafter referred to as ambient infrared light) to obtain the $N^{th}$ frame of collection image (in this case, it is the first image, also known as a background image) when the laser projector 14 does not project a laser, and sends the $N^{th}$ frame of collection image to the processor 20 through the mobile industry processor interface; then, the image collector 15 receives the ambient infrared light and an infrared laser emitted by the laser projector 14 to acquire the $(N+1)^{th}$ frame of collection image (in this case, it is the second image, also known as an interference speckle image) when the laser projector 14 projects a laser, and sends the $(N+1)^{th}$ frame of collection image to the processor 20 through the mobile industry processor interface; subsequently, the image collector 15 receives the ambient infrared light again to obtain the $(N+2)^{th}$ frame of collection image (in this case, it is the first image) when the laser projector 14 does not project a laser, and sends the $(N+2)^{th}$ frame of collection image to the processor 20 through the mobile industry processor interface, and so on, that is, the image collector 15 alternately obtains the first image and the second image.

In another example, the processor 20 sends a collection instruction for acquiring a depth image to the image collector 15 via an I2C bus. The image collector 15 controls the switching element through the first strobe signal to send the first pulse signal to the first driver 147 after receiving the image collection instruction, the first driver 147 drives the laser source 140 to project a laser at the first operating frequency according to the first pulse signal (that is, the laser projector 14 projects the laser at the first operating frequency), and the image collector 15 collects the infrared laser reflected by an object in a scene at the second operating frequency to obtain the collection image. As illustrated in FIG. 12, the solid line represents the laser emission timing of the laser projector 14, the dashed line represents the timing of the image collector 15 for acquiring the collection images and the number of frames of the collection images, and the dot dash line represents the number of frames of the third images obtained according to the first image and the second image, and the three kinds of lines, i.e., the solid line, the dashed line and the dot dash line are shown in this order from top to bottom in FIG. 12, and the second operating frequency is twice the first operating frequency. Referring to the solid line and the dashed line as illustrated in FIG. 12, the image collector 15 first receives the ambient infrared light to obtain the $N^{th}$ frame of collection image (in this case, it is the first image, also known as a background image) when the laser projector 14 does not project a laser, and sends the $N^{th}$ frame of collection image to the processor 20 through the mobile industry processor interface; then, the image collector 15 receives the ambient infrared light and an infrared laser emitted by the laser projector 14 to acquire the $(N+1)^{th}$ frame of collection image (in this case, it is the second image, also known as an interference speckle image) when the laser projector 14 projects the laser, and sends the $(N+1)^{th}$ frame of collection image to the processor 20 through the mobile industry processor interface; subsequently, the image collector 15 receives the ambient infrared light again to obtain the $(N+2)^{th}$ frame of collection image (in this case, it is the first image) when the laser projector 14 does not project a laser, and sends the $(N+2)^{th}$ frame of collection image to the processor 20 through the mobile industry processor interface, and so on, that is, the image collector 15 alternately obtains the first image and the second image.

It should be noted that the image collector 15 may simultaneously perform the acquisition of the collection image while sending the collection image to the processor 20. Moreover, it is also possible that the image collector 15 acquires the second image first, and then acquires the first image, and alternately perform the acquisition of the collection image in this order. In addition, the above-described multiple relationship between the second operating frequency and the first operating frequency is only used as an example, and in other embodiments, the multiple relationship between the second operating frequency and the first operating frequency may also be three times, four times, five times, six times and so on.

Each time the processor 20 receives a frame of collection image, the processor 20 will distinguish the received collection image and determine whether the collection image is the first image or the second image. After receiving at least one frame of first image and at least one frame of second image, the processor 20 may calculate the depth image according to the first image, the second image and the reference image. Specifically, since the first image is collected when the laser projector 14 does not project a laser, light that forms the first image includes only the ambient infrared light, and since the second image is collected when the laser projector 14 projects a laser, light that forms the second image includes both the ambient infrared light and the infrared laser emitted by the laser projector 14. Therefore, the processor 20 can remove the collection image formed by the ambient infrared light from the second image according to the first image, so as to obtain the collection image only formed by the infrared laser (i.e., the speckle image formed by the infrared laser).

It will be understood that the ambient light includes infrared light with the same wavelength as the infrared laser emitted by the laser projector 14 (for example, including ambient infrared light with a wavelength of 940 nm), and this part of infrared light will also be received by the image collector 15 when the image collector 15 acquires the collection image. When the brightness of the scene is high, the proportion of the ambient infrared light in the light received by the image collector 15 will increase, resulting in inconspicuous laser speckles in the collection image, thereby affecting the calculation of the depth image.

The controlling method according to the present disclosure controls the laser projector 14 and the image collector 15 to work at different operating frequencies, so that the image collector 15 is able to collect both the first image only formed by the ambient infrared light and the second image formed by both the ambient infrared light and the infrared laser emitted by the laser projector 14, remove a part of the second image formed by the ambient infrared light according to the first image, so as to distinguish the laser speckles, and calculate the depth image using the collection image formed only by the infrared laser emitted by the laser projector 14, without affecting the laser speckle matching, which avoids partial or complete loss of the depth information, thereby improving the accuracy of the depth image.

Figure 13:
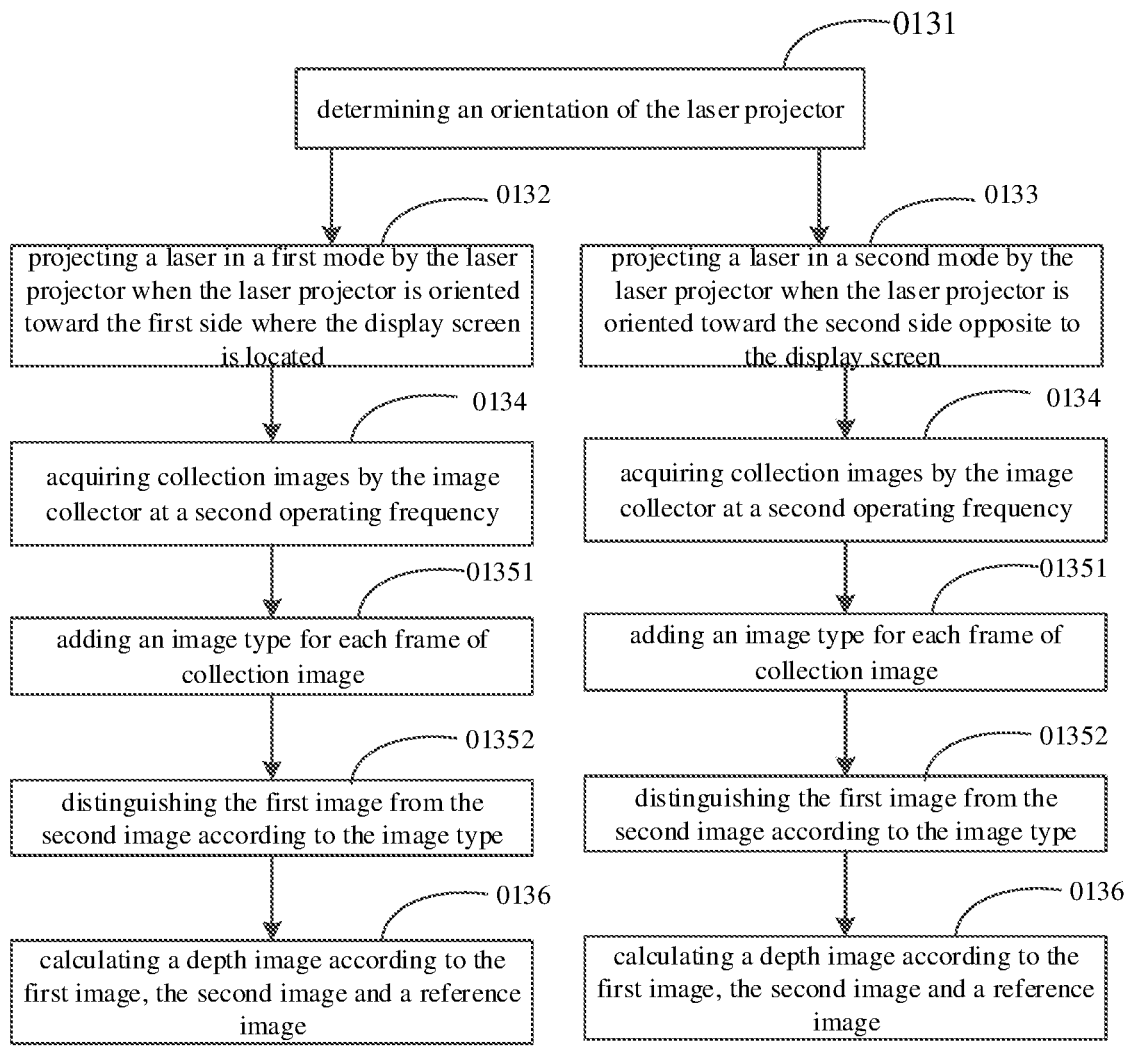
FIG. 13 is a schematic flowchart of a controlling method for an electronic device according to some embodiments of the present disclosure.

As illustrated in FIG. 1, FIG. 2 and FIG. 13, in some embodiments, the controlling method includes:

0131, determining an orientation of the laser projector 14;

0132, projecting a laser in a first mode by the laser projector 14 when the laser projector 14 is oriented toward the first side where the display screen 12 is located;

0133, projecting a laser in a second mode by the laser projector 14 when the laser projector 14 is oriented toward the second side opposite to the display screen 12, the energy of the laser projected in the second mode is greater than that of the laser projected in the first mode;

0134, acquiring collection images by the image collector 15 at a second operating frequency when the laser projector 14 projects a laser to a scene at a first operating frequency, the second operating frequency being greater than the first operating frequency;

01351, adding an image type for each frame of collection image;

01352, distinguishing the first image from the second image according to the image type; and 0136, calculating a depth image according to the first image, the second image and a reference image.

Figure 14:
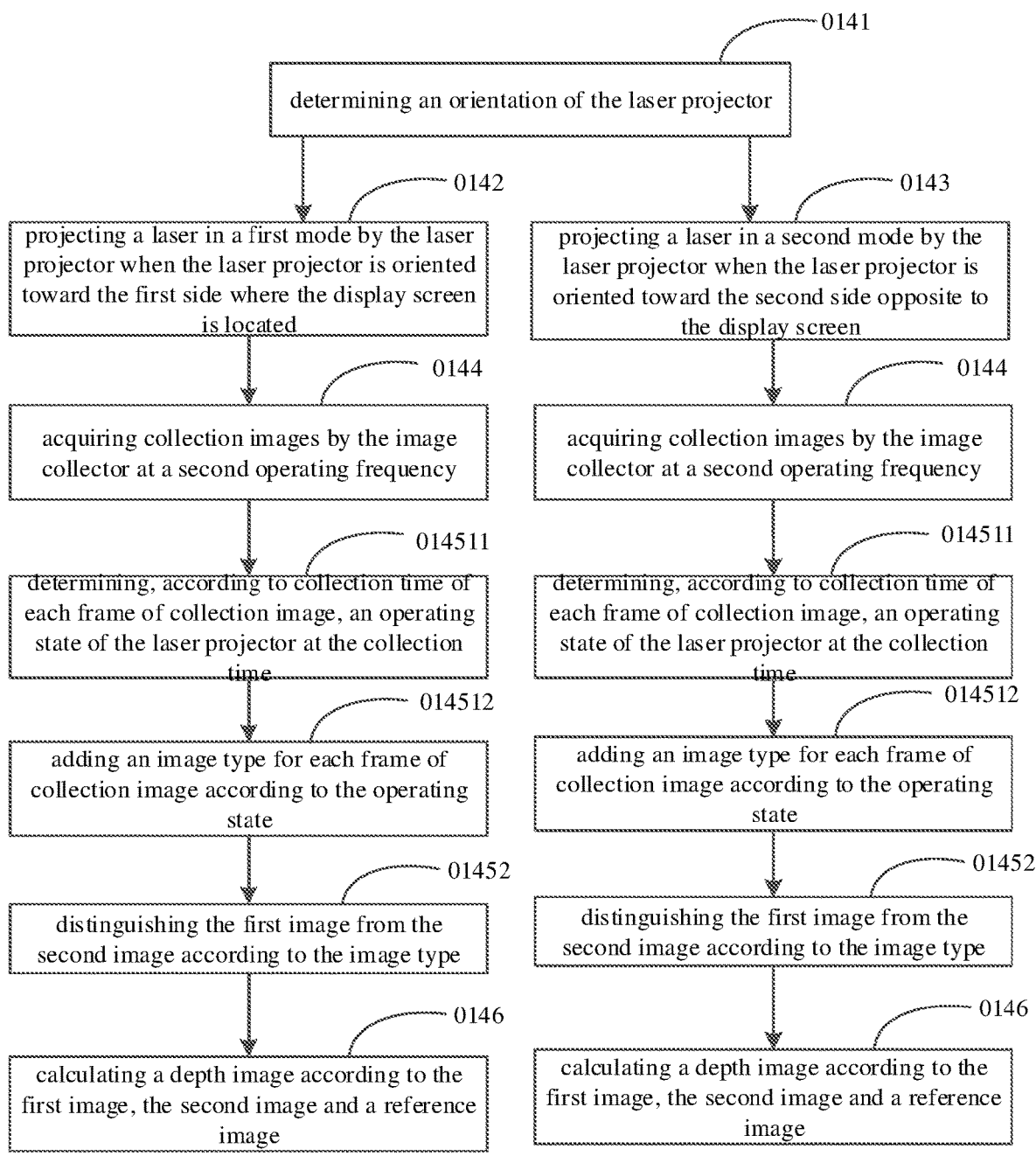
FIG. 14 is a schematic flowchart of a controlling method for an electronic device according to some embodiments of the present disclosure.

As illustrated in FIG. 1, FIG. 2 and FIG. 14, in some embodiments, the controlling method includes:

0141, determining an orientation of the laser projector 14;

0142, projecting a laser in a first mode by the laser projector 14 when the laser projector 14 is oriented toward the first side where the display screen 12 is located;

0143, projecting a laser in a second mode by the laser projector 14 when the laser projector 14 is oriented toward the second side opposite to the display screen 12, the energy of the laser projected in the second mode is greater than that of the laser projected in the first mode;

0144, acquiring collection images by the image collector 15 at a second operating frequency when the laser projector 14 projects a laser to a scene at a first operating frequency, the second operating frequency being greater than the first operating frequency;

014511, determining, according to collection time of each frame of collection image, an operating state of the laser projector 14 at the collection time;

014512, adding an image type for each frame of collection image according to the operating state;

01452, distinguishing the first image from the second image according to the image type; and

0146, calculating a depth image according to the first image, the second image and a reference image.

The above controlling method may also be implemented by the electronic device 100, in which the step 0131 is basically the same as the step 041 described hereinbefore, the step 0132 is basically the same as the step 042 described hereinbefore, the step 0133 is basically the same as the step 043 described hereinbefore, the step 0134 is basically the same as the step 0114 described hereinbefore, the steps 01351 and 01352 may be sub-steps of the step 0115 described hereinbefore, and the step 0136 is basically the same as the step 0116 described hereinbefore; the step 0141 is basically the same as the step 041 described hereinbefore, the step 0142 is basically the same as the step 042 described hereinbefore, the step 0143 is basically the same as the step 043 described hereinbefore, the step 0144 is basically the same as the step 0114 described hereinbefore, the steps 014511 and 014512 may be sub-steps of the step 01351 described hereinbefore, the step 01452 is basically the same as the step 01352 described hereinbefore, and the step 0146 is basically the same as the step 0116 described hereinbefore. The steps 01351, 01352, 014511, 014512 and 01452 all may be implemented by the processor 20. In other words, the processor 20 may also be configured to add an image type for each frame of collection image, and distinguish the first image from the second image according to the image type. When the processor 20 is configured to add the image type for each frame of collection image, the processor 20 is specifically configured to determine, according to the collection time of each frame of collection image, the operating state of the laser projector 14 at the collection time, and add the image type for each frame of collection image according to the operating state.

Specifically, each time the processor 20 receives a frame of collection image from the image collector 15, the processor 20 will add the image type (stream_type) for the collection image, so that the first image and the second image may be distinguished according to the image type in subsequent processing. Specifically, during the acquisition of the collection image by the image collector 15, the processor 20 will monitor the operating state of the laser projector 14 in real time via the I2C bus. Each time the processor 20 receives a frame of collection image from the image collector 15, the processor 20 will acquire the collection time of the collection image first, and then determine according to the collection time of the collection image whether the laser projector 14 projects a laser or not during the collection time of the collection image, and add the image type for the collection image based on the judgment result. The collection time of the collection image may be start time or end time each time the image collector 15 acquires the collection image, or any time between the start time and the end time. In this way, it is possible to realize the correspondence between each frame of collection image and the operating state (projecting a laser or not) of the laser projector 14 during the acquisition of this frame of collection image, and accurately distinguish the type of the collection image. In an example, structures of the image type (stream_type) are shown in Table 1:

TABLE 1

| stream_type | | |
|---|---|---|
| stream | | light |
| 0 | 0 | 0 |
| 0 | 0 | 1 |

As illustrated in Table 1, when the stream is 0, it means that the data stream at this time is an image formed by the infrared light and/or the infrared laser. When the light is 00, it means that the data stream at this time is acquired without any equipment projecting the infrared light and/or the infrared laser (there is only the ambient infrared light), then the processor 20 may add a stream_type 000 for the collection image to identify this collection image as the first image. When the light is 01, it means that the data stream at this time is acquired when the laser projector 14 projects the infrared laser (there are both the ambient infrared light and the infrared laser), then the processor 20 may add a stream_type 001 for the collection image to identify this collection image as the second image. The processor 20 may distinguish the image types of the collection images according to the stream_type in the subsequent processing.

Figure 15:
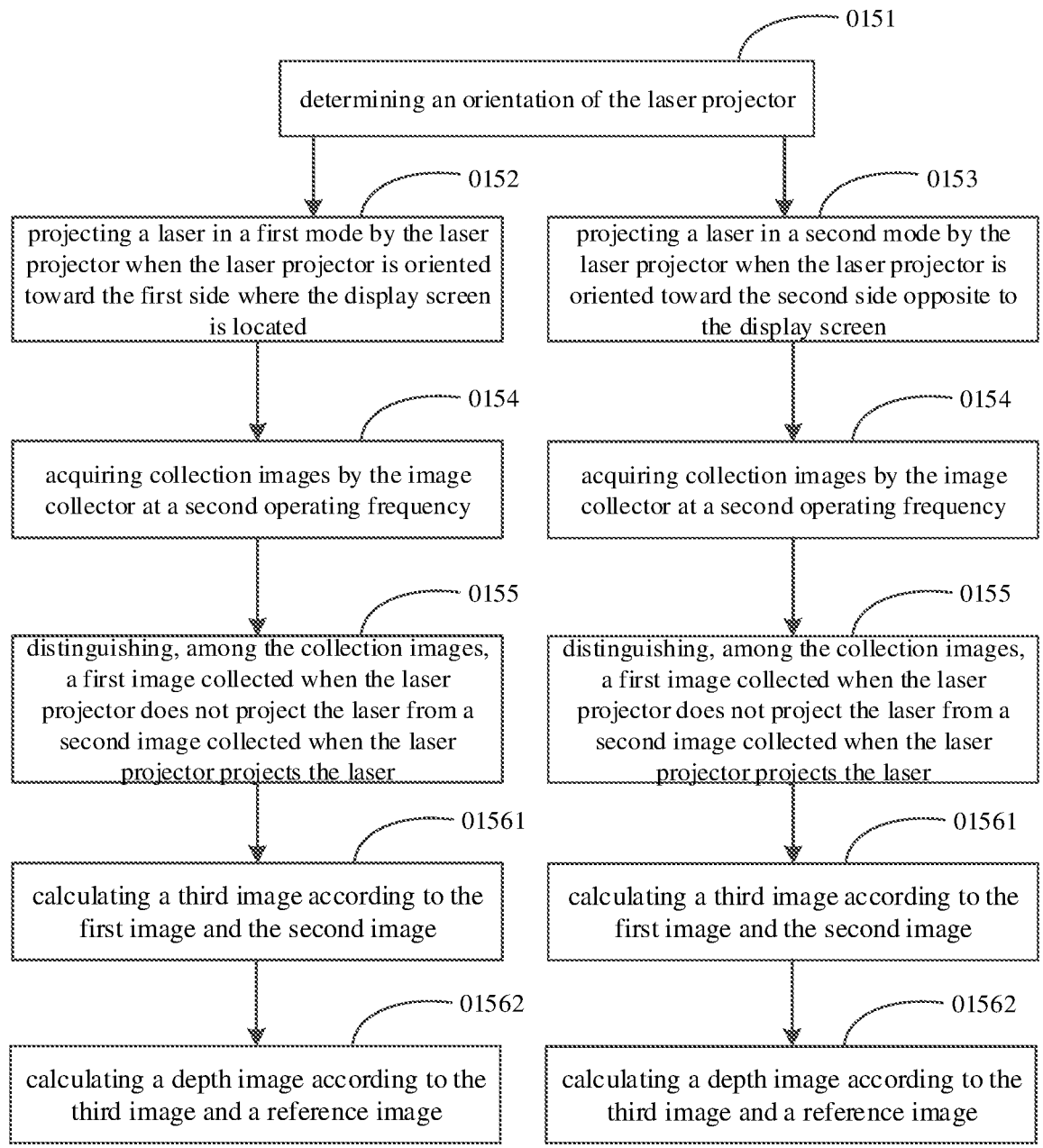
FIG. 15 is a schematic flowchart of a controlling method for an electronic device according to some embodiments of the present disclosure.

As illustrated in FIG. 1, FIG. 2 and FIG. 15, in some embodiments, the controlling method includes:

0151, determining an orientation of the laser projector 14;

0152, projecting a laser in a first mode by the laser projector 14 when the laser projector 14 is oriented toward the first side where the display screen 12 is located;

0153, projecting a laser in a second mode by the laser projector 14 when the laser projector 14 is oriented toward the second side opposite to the display screen 12, the energy of the laser projected in the second mode is greater than that of the laser projected in the first mode;

0154, acquiring collection images by the image collector 15 at a second operating frequency when the laser projector 14 projects a laser to a scene at a first operating frequency, the second operating frequency being greater than the first operating frequency;

0155, distinguishing, among the collection images, a first image collected when the laser projector 14 does not project the laser from a second image collected when the laser projector 14 projects the laser;

01561, calculating a third image according to the first image and the second image, a difference between collection time of the first image and collection time of the second image being less than a preset value; and

01562, calculating a depth image according to the third image and a reference image.

The above controlling method may also be implemented by the electronic device 100, in which the step 0151 is basically the same as the step 041 described hereinbefore, the step 0152 is basically the same as the step 042 described hereinbefore, the step 0153 is basically the same as the step 043 described hereinbefore, the step 0154 is basically the same as the step 0114 described hereinbefore, the step 0155 is basically the same as the step 0115 described hereinbefore, and the steps 01561 and 01562 may be sub-steps of the step 0116 described hereinbefore. The steps 01561 and 01562 may be implemented by the processor 20. That is, the processor 20 may be further configured to calculate the third image according to the first image and the second image, and calculate the depth image according to the third image and the reference image. The difference between the collection time of the first image and the collection time of the second image is less than the preset value.

In the calculation of the depth image, the processor 20 may first distinguish the first images from the second images, and then select the second image of any frame and the first image of a specific frame corresponding to the second image of the any frame according to the collection time, and the difference between the collection time of the first image of the specific frame and the collection time of the second image of the any frame is less than the preset value. Subsequently, the processor 20 calculates the third image according to the first image of the specific frame and the second image of the any frame, and the third image is a collection image formed by only the infrared laser emitted by the laser projector 14, which may also be referred to as an actual speckle image. Specifically, there is a one-to-one correspondence between a plurality of pixels in the first image and a plurality of pixels in the second image. Assuming that the first image is represented by P1, the second image is represented by P2, and the third image is represented by P3, the processor 20 may subtract a pixel value of a pixel $P1_{i,j}$ in the first image from a pixel value of a pixel $P2_{i,j}$ in the second image to obtain a pixel value of a pixel $P3_{i,j}$ in the third image, i.e., $P3_{i,j}=P2_{i,j}-P1_{i,j}$, $i \in N+$, $j \in N+$. Subsequently, the processor 20 may calculate the depth image according to the third image and the reference image. It should be noted that the number of frames of the second images, the number of frames of the third images, and the number of frames of the depth images are equal. It will be understood that since the difference between the collection time of the first image and the collection time of the second image is small, the intensity of the ambient infrared light in the first image is closer to that of the ambient infrared light in the second image, the accuracy of the third image calculated according to the first image and the second image is higher, which further reduces the influence of the ambient infrared light on the acquisition of the depth image.

In some embodiments, the processor 20 may also add an image type for the third image and the depth image, so as to distinguish data streams obtained after processing the collection images. As illustrated in table 2:

TABLE 2

| stream | stream_type | |
|---|---|---|
| | light | |
| 0 | 1 | 1 |
| 1 | X | X |

As illustrated in Table 2, when the stream is 0, it means that the data stream at this time is an image formed by the infrared light and/or the infrared laser, when the stream is 1, it means that the data stream at this time is the depth image. When the light is 11, it means background subtraction, i.e., removing a part of the collection image formed by the ambient infrared light, then the processor 20 may add a stream_type 011 for the data stream after the background subtraction to identify this data stream as the third image. When the light is XX, where X indicates an unlimited value, the processor 20 may add a stream_type 1XX for the data stream obtained after depth calculation to identify this data stream as the depth image.

In some embodiments, for the first image and the second image that participate in the calculation of the depth image, the collection time of the first image may be either before or after the collection time of the second image, which will not be limited herein.

In some embodiments, when the difference between the collection time of the first image and the collection time of the second image is less than the preset value, the first image and the second image may be images of adjacent frames or images of non-adjacent frames. For example, when the second operating frequency is twice the first operating frequency, the first image and the second image whose collection time difference is less than the preset value are the images of adjacent frames; when the second operating frequency is more than twice the first operating frequency, for example, the second operating frequency is three times the first operating frequency, the first image and the second image whose collection time difference is less than the preset value may be the images of adjacent frames or the images of non-adjacent frames (in this case, there is still a frame of first image between the first image and the second image).

In some embodiments, there may be several frames of first images participating in the calculation of the depth image. For example, when the second operating frequency is three times the first operating frequency, two adjacent frames of first images and one frame of second image adjacent to the two frames of first images may be selected to calculate the third image. In this case, the processor 20 may first perform fusion processing on the two frames of first images, for example, add pixel values of corresponding pixels of the two frames of first images and then take the average value to obtain a fusion processed first image, and then calculate the third image using the fusion processed first image and the one frame of second image adjacent to the two frames of first images.

In some embodiments, the processor 20 may calculate multiple frames of third image, such as the $[(N+1)-N]^{th}$ frame of third image, the $[(N+3)-(N+2)]^{th}$ frame of third image, the $[(N+5)-(N+4)]^{th}$ frame of third image, etc., as illustrated in FIG. 12, and calculate multiple frames of depth images corresponding to the multiple frames of third image. Of course, in other embodiments, it is also possible that the processor 20 only calculates one frame of third image, and calculates one frame of depth image corresponding to the one frame of third image. The number of frames of the third image may be determined according to a security level of an application scene. Specifically, when the application scene requires a high security level, such as a payment scene, more frames of third images should be calculated, in this case, a payment action will be executed only when multiple frames of depth images are all successfully matched with a depth template of the user, so as to improve the security of payment; while for application scenes requiring a low security level, such as an application scene for portrait beautification based on depth information, less frames of third images are required, such as one frame of third image, in this case, one frame of depth image is enough for performing the portrait beautification. In this way, the calculation amount and power consumption of the processor 20 may be reduced, and the image processing speed may be increased.

Figure 16:
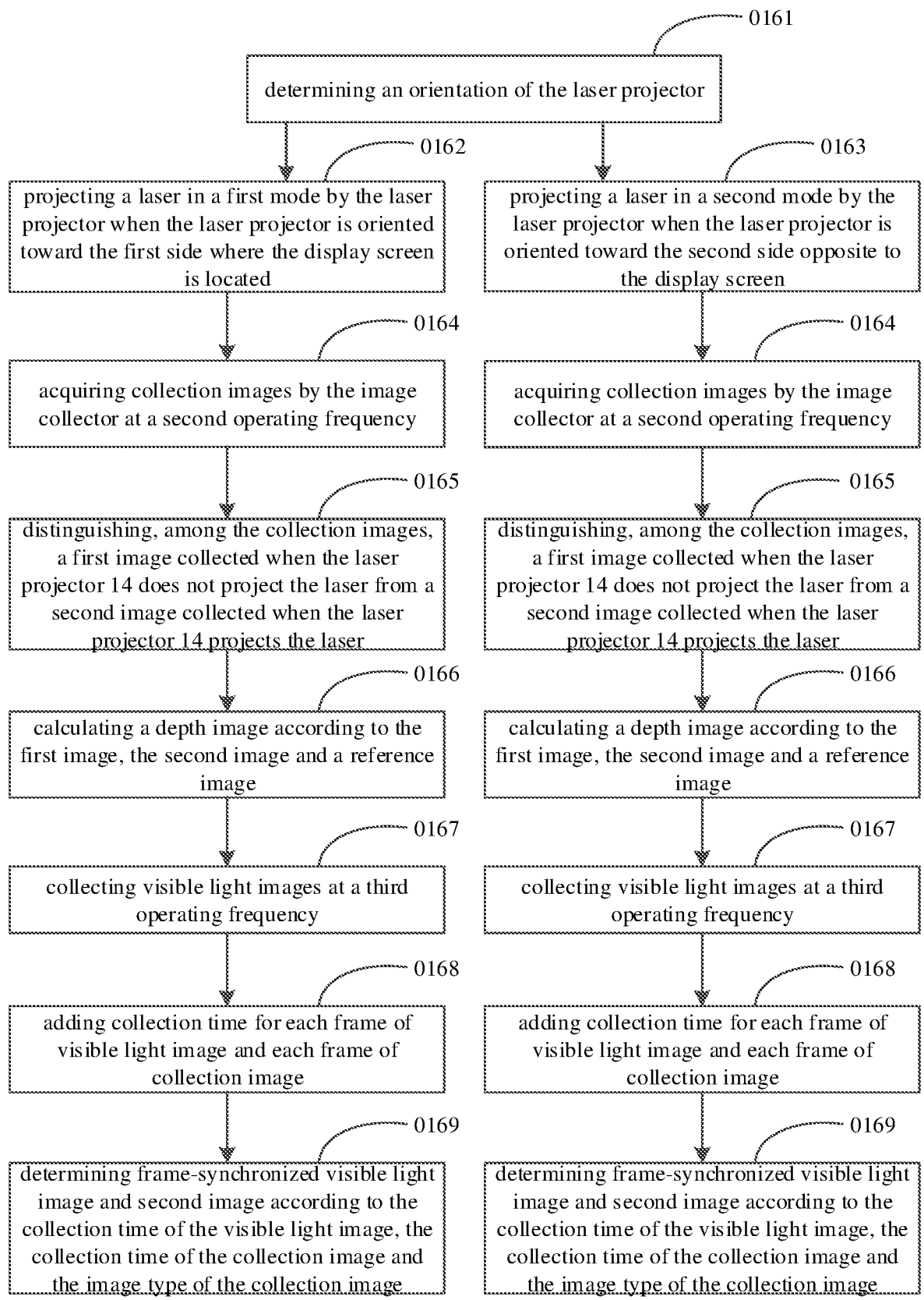
FIG. 16 is a schematic flowchart of a controlling method for an electronic device according to some embodiments of the present disclosure.

As illustrated in FIG. 1, FIG. 2 and FIG. 16, in some embodiments, the controlling method further includes:

0167, collecting visible light images at a third operating frequency, the third operating frequency being greater than or less than the second operating frequency;

0168, adding collection time for each frame of visible light image and each frame of collection image; and 0169, determining frame-synchronized visible light image and second image according to the collection time of the visible light image, the collection time of the collection image and the image type of the collection image.

That is, the controlling method includes:

0161, determining an orientation of the laser projector 14;

0162, projecting a laser in a first mode by the laser projector 14 when the laser projector 14 is oriented toward the first side where the display screen 12 is located;

0163, projecting a laser in a second mode by the laser projector 14 when the laser projector 14 is oriented toward the second side opposite to the display screen 12, the energy of the laser projected in the second mode is greater than that of the laser projected in the first mode;

0164, acquiring collection images by the image collector 15 at a second operating frequency when the laser projector 14 projects a laser to a scene at a first operating frequency, the second operating frequency being greater than the first operating frequency;

0165, distinguishing, among the collection images, a first image collected when the laser projector 14 does not project the laser from a second image collected when the laser projector 14 projects the laser;

0166, calculating a depth image according to the first image, the second image and a reference image;

0167, collecting visible light images at a third operating frequency, the third operating frequency being greater than or less than the second operating frequency;

0168, adding collection time for each frame of visible light image and each frame of collection image; and 0169, determining frame-synchronized visible light image and second image according to the collection time of the visible light image, the collection time of the collection image and the image type of the collection image.

The above controlling method may also be implemented by the electronic device 100, in which the step 0161 is basically the same as the step 041 described hereinbefore, the step 0162 is basically the same as the step 042 described hereinbefore, the step 0163 is basically the same as the step 043 described hereinbefore, the step 0164 is basically the same as the step 0114 described hereinbefore, the step 0165 is basically the same as the step 0115 described hereinbefore, and the step 0166 is basically the same as the step 0116 described hereinbefore. The step 0167 may be implemented by the visible light camera 40 (any one of the primary camera 41 and the secondary camera, or the primary camera 41 and the secondary camera 42 together). The steps 0168 and 0169 may be implemented by the processor 20. In other words, the visible light camera 40 may be configured to collect the visible light images at the third operating frequency, and the third operating frequency is greater than or less than the second operating frequency. The processor 20 may be configured to add the collection time for each frame of visible light image and each frame of collection image, and determine the frame-synchronized visible light image and second image according to the collection time of the visible light image, the collection time of the collection image and the image type of the collection image.

In some application scenes, for example, in an application scene for 3D modeling an object in the scene, the image collector 15 is used to obtain depth information of the object in the scene, and the visible light camera 40 is used to obtain color information of the object in the scene, so as to realize the 3D modeling. In this case, the processor 20 needs to turn on the image collector 15 to obtain the depth image and simultaneously turn on the visible light camera 40 to obtain the visible light image.

If the image collector 15 and the visible light camera 40 have the same operating frequency, that is, the image collector 15 and the visible light camera 40 both work at the second operating frequency, then the processor 20 may send an image collection instruction to the image collector 15 via the I2C bus, after receiving the image collection instruction, the image collector 15 is synchronized with the visible light camera 40 through a sync signal, which controls the visible light camera 40 to collect the visible light image, so as to realize hardware synchronization between the image collector 15 and the visible light camera 40. In this case, the number of frames of collection images is consistent with the number of frames of visible light images, and there is a one-to-one correspondence between the collection images and the visible light images.

However, when the operating frequency of the image collector 15 is different from that of the visible light camera 40, that is, the image collector 15 works at the second operating frequency, while the visible light camera 40 works at a third operating frequency that is not equal to the second operating frequency, the image collector 15 and the visible light camera 40 cannot achieve the hardware synchronization. In this case, the processor 20 needs to achieve the synchronization between the image collector 15 and the visible light camera 40 through software synchronization. Specifically, the processor 20 sends an image collection instruction to the image collector 15 through an I2C bus connected to the image collector 15, and at the same time sends an image collection instruction to the visible light camera 40 through an I2C bus connected to the visible light camera 40. Each time the processor 20 receives a frame of collection image, the processor 20 will add the image type and the collection time for the collection image. In addition, each time the processor 20 receives a frame of visible light image, the processor 20 will add the collection time for the visible light image. The collection time of the collection image may be start time or end time each time the image collector 15 collects the collection image, or any time between the start time and the end time; and the collection time of the visible light image may be start time or end time each time the visible light camera 40 collects the visible light image, or any time between the start time and the end time. Then, in the subsequent processing (such as 3D modeling, and portrait beautifying in virtue of the depth information, etc.) based on the depth image and the visible light image, the processor 20 may first determine the frame-synchronized visible light image and second image according to the collection time of the visible light image, the collection time of the collection image and the type of the collection image. It should be noted that frame-synchronization indicates that the collection time difference between the determined second image and visible light image is less than the preset value, and the collection time of the visible light image may be either before or after the collection time of the second image. Subsequently, the processor 20 selects the first image according to the determined second image to further calculate the depth image according to the second image, the first image and the reference image. Finally, the processor 20 performs subsequent processing based on the depth image and the determined visible light image.

In some embodiments, the processor 20 may also add collection time for each frame of depth image, and then determine the frame-synchronized visible light image and depth image according to the collection time of the visible light image and the collection time of the depth image, and finally perform subsequent processing on the frame-synchronized visible light image and depth image. The collection time of each frame of depth image is the collection time of the second image corresponding to this frame of depth image.

Figure 17:
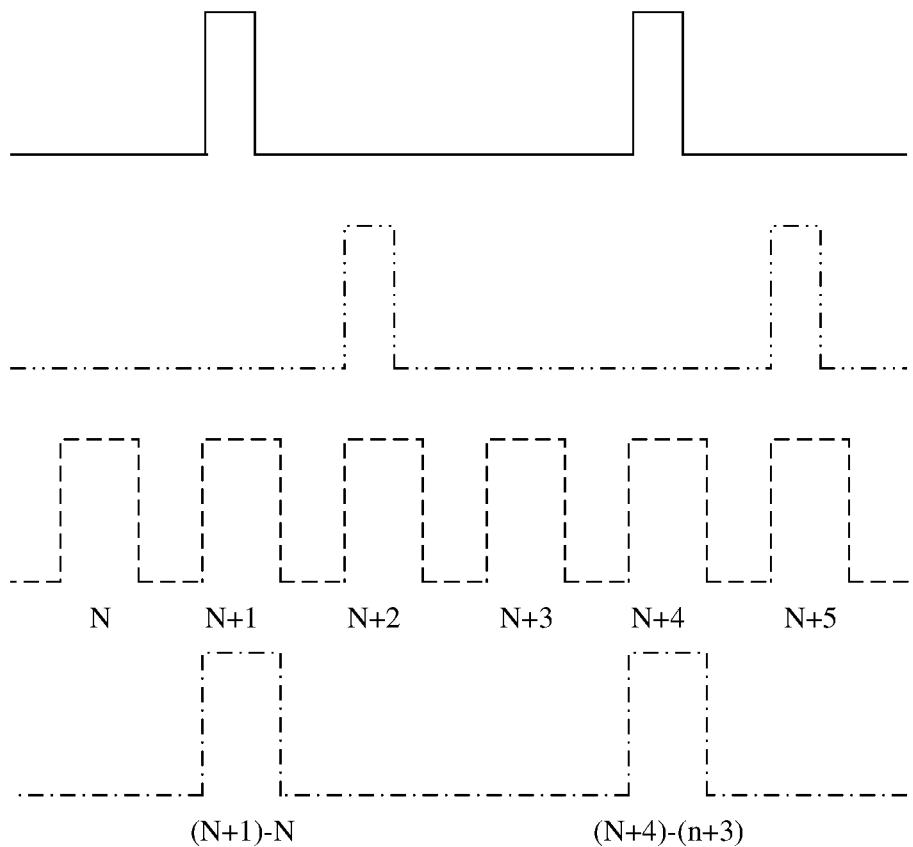
FIG. 17 is a schematic diagram illustrating a principle of a controlling method for an electronic device according to some embodiments of the present disclosure.

As illustrated in FIG. 17, in some embodiments, the collection image also includes an infrared image, and the infrared image is an image formed by infrared light emitted by the floodlight 50 and collected by image collector 15. When the processor 20 adds the image type for each frame of collection image, the processor 20 also adds an image type for the infrared image. In an example, the image type of the infrared images is shown in Table 3.

TABLE 3

| stream_type | |
|---|---|
| stream | light |
| 0 | 1 | 0 |

In Table 3, when the stream is 0, it means that the data stream at this time is an image formed by infrared light and/or infrared laser. When the light is 10, it means that the data stream at this time is obtained in the case that the floodlight 50 projects infrared light and the laser projector 14 does not project a laser. Then, when the processor 20 adds the stream_type 010 for a frame of collection image, it identifies that this frame of collection image is an infrared image.

In some application scenes, such as in identity verification based on both the matching of the depth image with a depth template and the matching of the infrared image with an infrared template, the image collector 15 needs to be cooperated with the floodlight 50 and the laser projector 14, and the image collector 15 obtains the first image, the second image and the infrared image in a time-sharing manner. As illustrated in FIG. 17, a solid line represents laser emitting timing of the laser projector 14, a double-dot dash line represents infrared light emitting timing of the floodlight 50, a dashed line represents timing of the image collector 15 for acquiring the collection images and the number of frames of the collection images, and a dot dash line represents the number of frames of the third images obtained according to the first image and the second image, and these four kinds of lines, i.e., the solid line, the double-dot dash line, the dashed line and the dot dash line are shown in this order from top to bottom in FIG. 17, the second operating frequency is three times the first operating frequency, and the second operating frequency is three times a fourth operating frequency. The processor 20 may monitor the operating state of the floodlight 50 in real time via the I2C bus. Each time the processor 20 receives a frame of collection image from the image collector 15, the processor 20 will first acquire the collection time of the collection image, and then determine according to the collection time of the collection image whether the floodlight 50 emits infrared light or not during the collection time of the collection image, and add the image type for the collection image based on the judgment result. Subsequently, the processor 20 may determine the infrared image and the second image whose collection time difference is less than the preset value based on the collection time of the infrared images and the collection time of the second images. Further, the processor 20 may determine the infrared image and the depth image, and use the infrared image and the depth image for identity verification.

Figure 18:
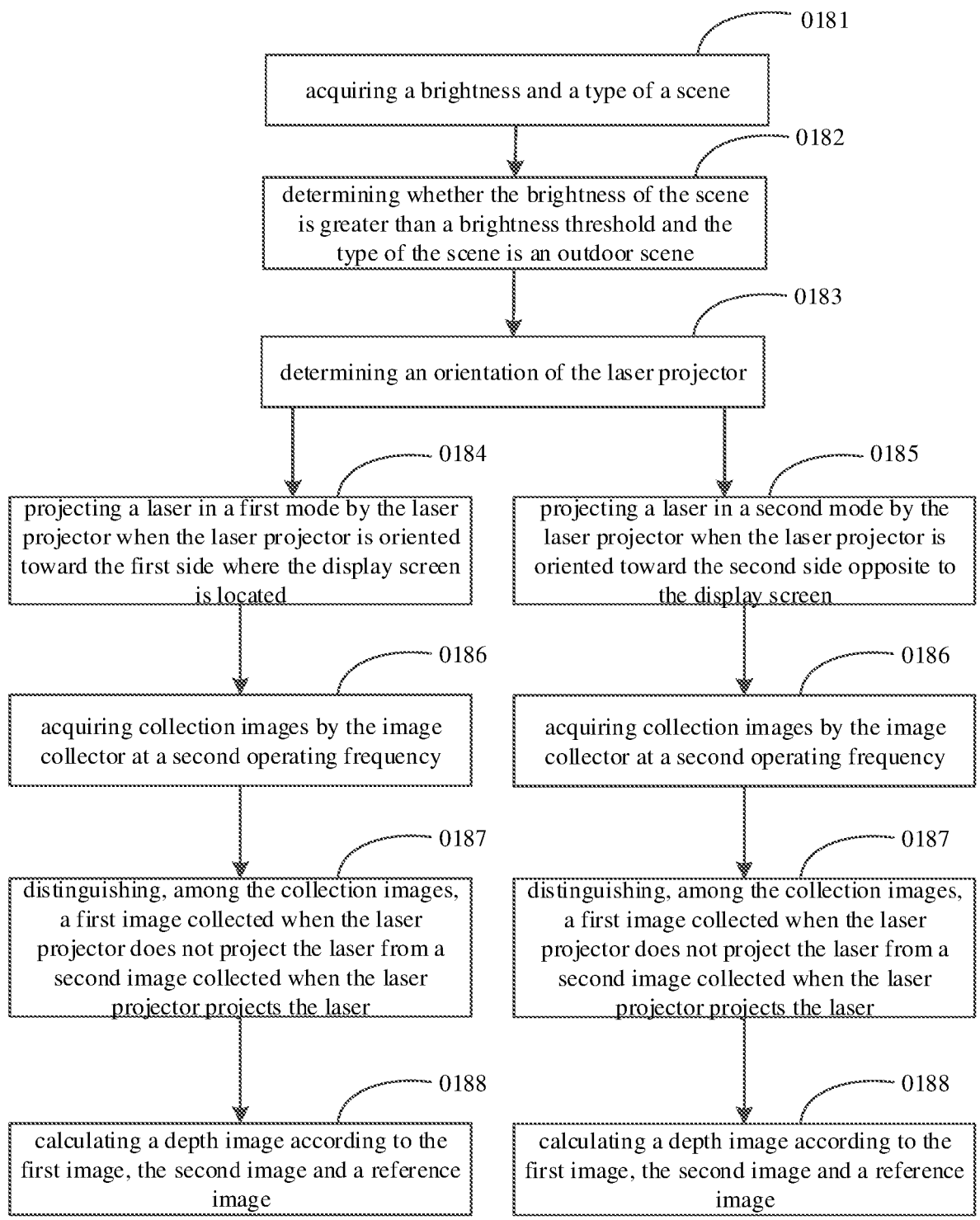
FIG. 18 is a schematic flowchart of a controlling method for an electronic device according to some embodiments of the present disclosure.

As illustrated in FIG. 1, FIG. 2 and FIG. 18, in some embodiments, the controlling method further includes:
- 0181, acquiring a brightness and a type of a scene;
- 0182, determining whether the brightness of the scene is greater than a brightness threshold and the type of the scene is an outdoor scene; and
- if the brightness of the scene is greater than the brightness threshold and the type of the scene is the outdoor scene, entering a step of determining an orientation of the laser projector 14 (step 0183).

That is, the controlling method includes:
- 0181, acquiring a brightness and a type of a scene;
- 0182, determining whether the brightness of the scene is greater than a brightness threshold and the type of the scene is an outdoor scene;
- 0183, if the brightness of the scene is greater than the brightness threshold and the type of the scene is the outdoor scene, determining an orientation of the laser projector 14;
- 0184, projecting a laser in a first mode by the laser projector 14 when the laser projector 14 is oriented toward the first side where the display screen 12 is located;
- 0185, projecting a laser in a second mode by the laser projector 14 when the laser projector 14 is oriented toward the second side opposite to the display screen 12, the energy of the laser projected in the second mode is greater than that of the laser projected in the first mode;
- 0186, acquiring collection images by the image collector 15 at a second operating frequency when the laser projector 14 projects a laser to a scene at a first operating frequency, the second operating frequency being greater than the first operating frequency;
- 0187, distinguishing, among the collection images, a first image collected when the laser projector 14 does not project the laser from a second image collected when the laser projector 14 projects the laser; and
- 0188, calculating a depth image according to the first image, the second image and a reference image.

The above controlling method may also be implemented by the electronic device 100, in which the step 0183 is basically the same as the step 041 described hereinbefore, the step 0184 is basically the same as the step 042 described hereinbefore, the step 0185 is basically the same as the step 043 described hereinbefore, the step 0186 is basically the same as the step 0114 described hereinbefore, the step 0187 is basically the same as the step 0115 described hereinbefore, and the step 0188 is basically the same as the step 0116 described hereinbefore. Both the steps 0181 and 0182 may be implemented by the processor 20. That is, the processor 20 may be configured to acquire the brightness and the type of the scene, and determine whether the brightness of the scene is greater than the brightness threshold and the type of the scene is the outdoor scene. The laser projector 14 may be configured to project a laser to the scene at the first operating frequency when the brightness of the scene is greater than the brightness threshold and the type of the scene is the outdoor scene.

Specifically, the brightness of the scene may be obtained by analyzing the collection image acquired by the image collector 15 or the visible light image acquired by the visible light camera 40 (any one of the primary camera 41 and the secondary camera 42, or the primary camera 41 and the secondary camera 42 together). Alternatively, the brightness of the scene may also be directly detected by a light sensor, and the processor 20 reads a detected signal from the light sensor to obtain the brightness of the scene. The type of the scene may be obtained by analyzing the collection image acquired by the image collector 15 or the visible light image acquired by the visible light camera 40, for example, analyzing the collection image or the object in the visible light image obtained by the visible light camera 40 to determine whether the type of the scene is an outdoor scene or an indoor scene; and the type of the scene may also be determined directly according to a geographic location. Specifically, the processor 20 may acquire a positioning results of the scene by the global positioning system, and then further determine the type of the scene according to the positioning result, for example, if the positioning result shows a certain office building, it indicates that the scene is an indoor scene; if the positioning result shows a certain park, it indicates that the scene is an outdoor scene; if the positioning result shows a certain street, it indicates that the scene is an outdoor scene, and so on.

It will be understood that when the brightness of the scene is high (for example, the brightness is greater than the brightness threshold), the proportion of the ambient infrared light in the collection image is larger, which has a greater impact on speckle recognition. In this case, the interference of the ambient infrared light needs to be removed. However, when the brightness of the scene is low, the proportion of the ambient infrared light in the collection image is less, and the impact on the speckle recognition is small and may be ignored. In this case, the image collector 15 and the laser projector 14 can work at the same operating frequency, and the processor 20 calculates the depth image directly according to the collection image (i.e., the second image) acquired by the image collector 15 and the reference image. In addition, the high brightness of the scene may be caused by strong light of an indoor lamp, since the light of the lamp does not include infrared light, it will not generate a significant impact on the speckle recognition. In this case, the image collector 15 and the laser projector 14 work at the same operating frequency, and the processor 20 calculates the depth image directly according to the collection image (i.e., the second image) acquired by the image collector 15 and the reference image. In this way, the operating frequency and the power consumption of the image collector 15 are reduced.

Of course, in some embodiments, the controlling method may also determine whether to perform the step 0183 based only on the brightness of the scene. Specifically, the processor 20 only acquires the brightness of the scene and determines whether the brightness of the scene is greater than the brightness threshold, and the laser projector 14 projects a laser to the scene at the first operating frequency when the brightness is greater than the brightness threshold.

In some embodiments, the processor 20 may also add status information (status) for each data stream. In an example, as shown in Table 4:

TABLE 4

| stream | stream_type | | status |
|---|---|---|---|
| stream | light | valid | |
| 0 | 0 | 0 | 0 |
| 0 | 0 | 1 | 0 |
| 0 | 1 | 0 | 0 |
| 0 | 1 | 1 | 1 |

TABLE 4-continued

| stream | stream_type | | status |
|---|---|---|---|
| stream | light | valid | |
| 1 | X | X | 1 |
| 1 | X | X | 0 |

When the status is 0, it means that the data stream does not undergo background subtraction, and when the status is 1, it means that the data stream has undergone the background subtraction. In Table 4, 0000 means the first image; 0010 means the second image; 0100 means the infrared image acquired by the image collector 15 when the floodlight 50 is turned on; 0111 means the third image; 1XX1 means the depth image after the background subtraction; 1XX0 means the depth image without the background subtraction. In this way, the status information is added for each data stream, so that the processor 20 can distinguish whether individual data streams undergo the background subtraction.

In some embodiments, the processor 20 includes a first storage area, a second storage area, and a logical subtraction circuit, and the logical subtraction circuit is connected to both the first storage area and the second storage area. The first storage area is configured to store the first image, the second storage area is configured to store the second image, and the logical subtraction circuit is configured to process the first image and the second image to obtain the third image. Specifically, the logical subtraction circuit reads the first image from the first storage area, reads the second image from the second storage area, and performs subtraction processing on the first image and the second image to obtain the third image after acquiring the first image and the second image. The logic subtraction circuit is also connected to a depth calculation module (for example, it may be an application specific integrated circuit (ASIC) specifically used to calculate the depth) in the processor 20, and the logic subtraction circuit sends the third image to the depth calculation module, and the depth calculation module calculates the depth image according to the third image and the reference image.

Reference throughout this specification to "an embodiment," "some embodiments," "schematic embodiment," "one example," "an example," "a specific example," or "some examples," means that a particular feature, structure, material, or characteristic described in connection with the embodiment or example is included in at least one embodiment or example of the present disclosure. Thus, the appearances of these phrases in various places throughout this specification are not necessarily referring to the same embodiment or example of the present disclosure. Furthermore, the described particular features, structures, materials, or characteristics may be combined in any suitable manner in one or more embodiments or examples. In addition, in the absence of contradiction, different embodiments or examples described in this specification or the features of different embodiments or examples may be combined by those skilled in the art.

Any process or method described in a flow chart or described herein in other ways may be understood to represent a module, segment, or portion of code that includes one or more executable instructions to implement specified logic function(s) or that includes one or more executable instructions of the steps in the process, and the scope of a preferred embodiment of the present disclosure includes other implementations, in which the order of execution is different from what is shown or discussed, including executing functions in a substantially simultaneous manner or in an opposite order according to the related functions, which shall be understood by those skilled in the art to which the embodiments of the present disclosure belong.

Although embodiments have been shown and described above, it would be appreciated that the above embodiments are explanatory, which cannot be construed to limit the present disclosure, and changes, modifications, alternatives and variants can be made in the embodiments by those skilled in the art within the scope of the present disclosure.

What is claimed is:

1. A controlling method for an electronic device, wherein the electronic device comprises a housing, a display screen and a rotatable assembly, the display screen is disposed at a side of the housing, the rotatable assembly comprises a substrate and a laser projector disposed in the substrate, the substrate is rotatably installed to the housing such that the laser projector is selectively oriented toward a first side where the display screen is located or toward a second side opposite to the display screen; and the controlling method comprises:
  determining an orientation of the laser projector;
  projecting a laser in a first mode by the laser projector when the laser projector is oriented toward the first side where the display screen is located; and
  projecting a laser in a second mode by the laser projector when the laser projector is oriented toward the second side opposite to the display screen, the laser projected in the second mode having a greater energy than that of the laser projected in the first mode.

2. The controlling method according to claim 1, wherein the electronic device further comprises a Hall sensor assembly, the Hall sensor assembly comprises a first sensor and a second sensor, the first sensor is disposed in the substrate, and the second sensor is disposed in the housing and corresponds to the first sensor;
  wherein the determining the orientation of the laser projector comprises:
  determining the orientation of the laser projector through the Hall sensor assembly.

3. The controlling method according to claim 2, wherein the determining the orientation of the laser projector through the Hall sensor assembly comprises:
  acquiring a Hall value of the Hall sensor assembly;
  determining that the laser projector is oriented toward the first side where the display screen is located when the Hall value is less than a first preset value; and
  determining that the laser projector is oriented toward the second side opposite to the display screen when the Hall value is greater than a second preset value.

4. The controlling method according to claim 1, wherein the electronic device further comprises a state selection key, and the determining the orientation of the laser projector comprises:
  determining the orientation of the laser projector through the state selection key.

5. The controlling method according to claim 1, wherein a power of the laser projector for projecting the laser in the first mode is smaller than that of the laser projector for projecting the laser in second mode; or
  the laser projector comprises a plurality of point light sources each controlled independently; and the number of the point light sources turned on by the laser projector in the first mode is less than that of the point light sources turned on by the laser projector in the second mode.

6. The controlling method according to claim 1, wherein the electronic device further comprises an image collector disposed at a surface of the substrate where the laser projector is located;
  when the laser projector projects a laser, the laser projector projects the laser at a first operating frequency to a scene;
  wherein the controlling method further comprises:
  acquiring collection images by the image collector at a second operating frequency, the second operating frequency being greater than the first operating frequency;
  distinguishing, among the collection images, a first image collected when the laser projector does not project the laser from a second image collected when the laser projector projects the laser; and
  calculating a depth image according to the first image, the second image and a reference image.

7. An electronic device, comprising:
  a housing,
  a display screen, disposed at a side of the housing,
  a rotatable assembly, comprising a substrate and a laser projector disposed in the substrate, the substrate being rotatably installed to the housing such that the laser projector is selectively oriented toward a first side where the display screen is located or toward a second side opposite to the display screen, and
  a processor, configured to determine an orientation of the laser projector;
  wherein the laser projector is configured to:
  project a laser in a first mode when the laser projector is oriented toward the first side where the display screen is located; and
  project a laser in a second mode when the laser projector is oriented toward the second side opposite to the display screen,
  wherein the laser projected in the second mode has a greater energy than that of the laser projected in the first mode.

8. The electronic device according to claim 7, further comprising a Hall sensor assembly, wherein the Hall sensor assembly comprises a first sensor and a second sensor, the first sensor is disposed in the substrate, and the second sensor is disposed in the housing and corresponds to the first sensor; and the processor is further configured to determine the orientation of the laser projector through the Hall sensor assembly.

9. The electronic device according to claim 8, wherein the processor is further configured to:
  acquire a Hall value of the Hall sensor assembly;
  determine that the laser projector is oriented toward the first side where the display screen is located when the Hall value is less than a first preset value; and
  determine that the laser projector is oriented toward the second side opposite to the display screen when the Hall value is greater than a second preset value.

10. The electronic device according to claim 7, further comprising a state selection key, wherein the processor is further configured to determine the orientation of the laser projector through the state selection key.

11. The electronic device according to claim 7, wherein a power of the laser projector for projecting the laser in the first mode is smaller than that of the laser projector for projecting the laser in second mode; and/or
  the laser projector comprises a plurality of point light sources each controlled independently; and the number of the point light sources turned on by the laser projector in the first mode is less than that of the point light sources turned on by the laser projector in the second mode.

12. The electronic device according to claim 7, further comprising an image collector disposed at a surface of the substrate where the laser projector is located;
- wherein when the laser projector projects a laser, the laser projector is configured to project the laser at a first operating frequency to a scene; the image collector is configured to acquire collection images at a second operating frequency, and the second operating frequency is greater than the first operating frequency; and the processor is configured to:
- distinguish, among the collection images, a first image collected when the laser projector does not project the laser from a second image collected when the laser projector projects the laser; and
- calculate a depth image according to the first image, the second image and a reference image.

13. The electronic device according to claim 7, wherein the housing has an end surface and a rear surface opposite to the display screen, the rear surface is defined with a receiving groove penetrating the end surface, and the rotatable assembly is rotatably installed in the receiving groove; when the laser projector is oriented toward the first side where the display screen is located, the substrate protrudes from the end surface; when the laser projector is oriented toward the second side opposite to the display screen, a surface of the substrate is flush with the end surface of the housing.

14. The electronic device according to claim 7, wherein the housing has a front surface, a rear surface and an end surface, the front surface and the rear surface are located at two opposite sides of the housing, respectively, the end surface is connected with the front surface and the rear surface, the display screen is disposed on the front surface and defined with a notch at an end thereof close to the end surface, the housing is defined with an accommodating groove which penetrates the front surface, the rear surface and the end surface and is communicated with the notch, and the rotatable assembly is rotatably installed in the accommodating groove.

15. The electronic device according to claim 7, wherein the housing has a front surface, a rear surface and an end surface, the display screen is disposed on the front surface of the housing and covers 85% or more of an area of the front surface.

16. The electronic device according to claim 7, wherein the laser projector comprises a laser source, the laser source comprises a plurality of point light sources; and the plurality of the point light sources form a plurality of light emitting arrays arranged in an annular shape.

17. The electronic device according to claim 16, wherein the light emitting arrays are turned on in such a manner that the farther a light emitting array is away from a center of the laser source, the earlier the light emitting array is turned on.

18. The electronic device according to claim 7, wherein the laser projector comprises a laser source and a first driver, and the first driver is configured to drive the laser source to project a laser to an object to be measured.

19. The electronic device according to claim 7, wherein the housing has a front surface, a rear surface and an end surface, the display screen is disposed on the front surface of the housing and defined with a notch at an end thereof close to the end surface.

20. The electronic device according to claim 7, further comprising a floodlight disposed at a surface of the substrate where the laser projector is located.

* * * * *